March 28, 1950 D. BROIDO 2,501,930
REGISTERING DEVICE
Filed March 21, 1947 17 Sheets-Sheet 5
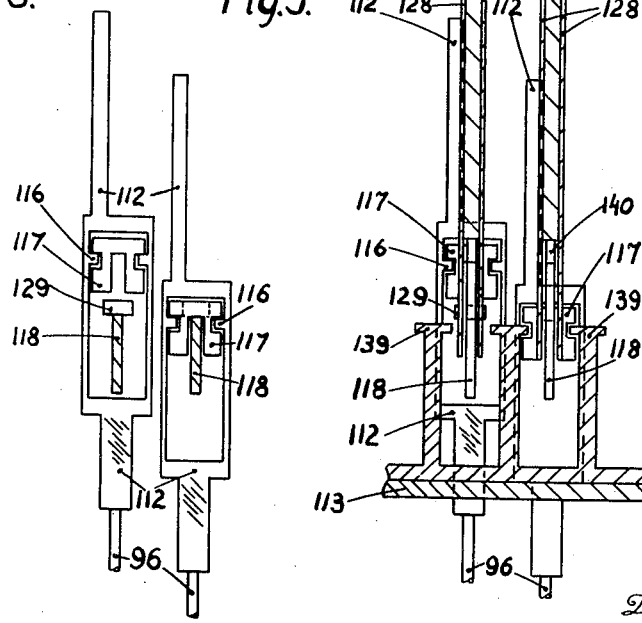
INVENTOR
Daniel Broido
BY
ATTORNEY March 28, 1950
D. BROIDO
2,501,930
REGISTERING DEVICE
Filed March 21, 1947
17 Sheets-Sheet 6
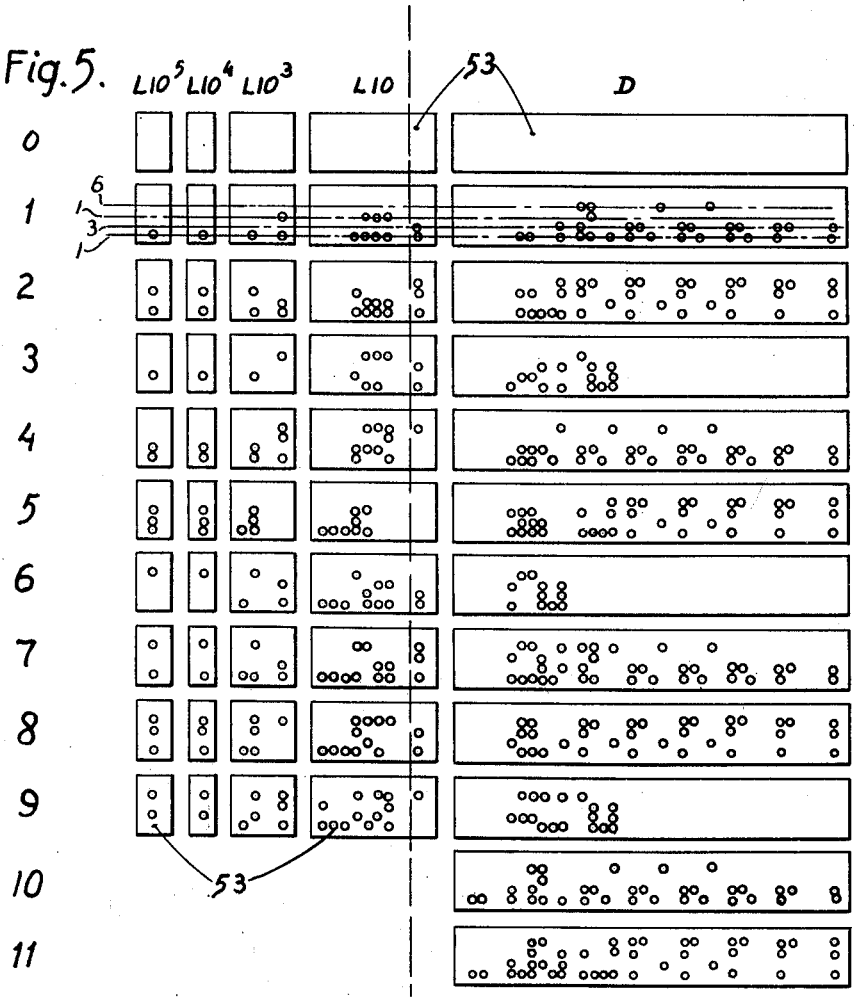
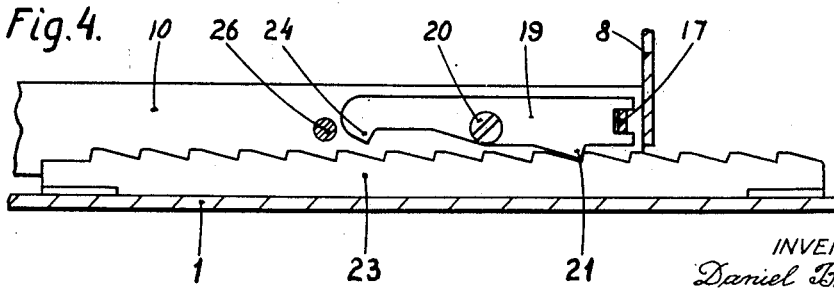
INVENTOR
Daniel Broido.
BY
A. Knight Broad
ATTORNEY March 28, 1950

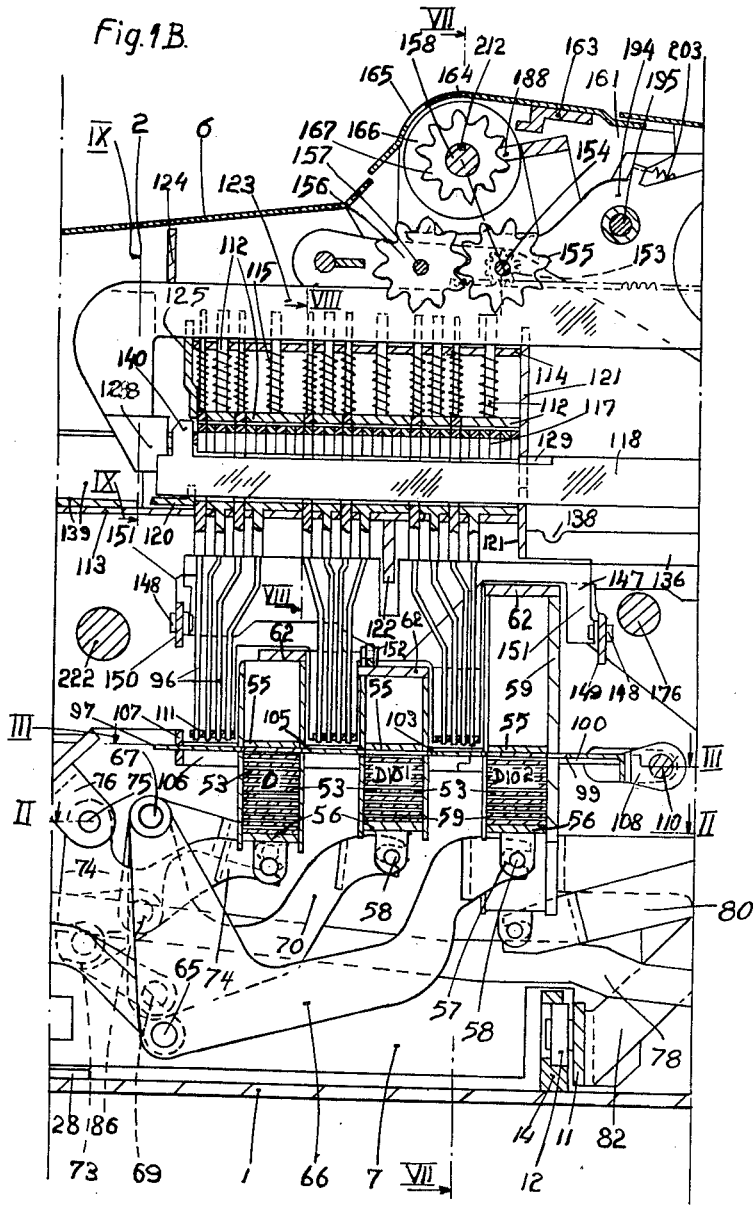

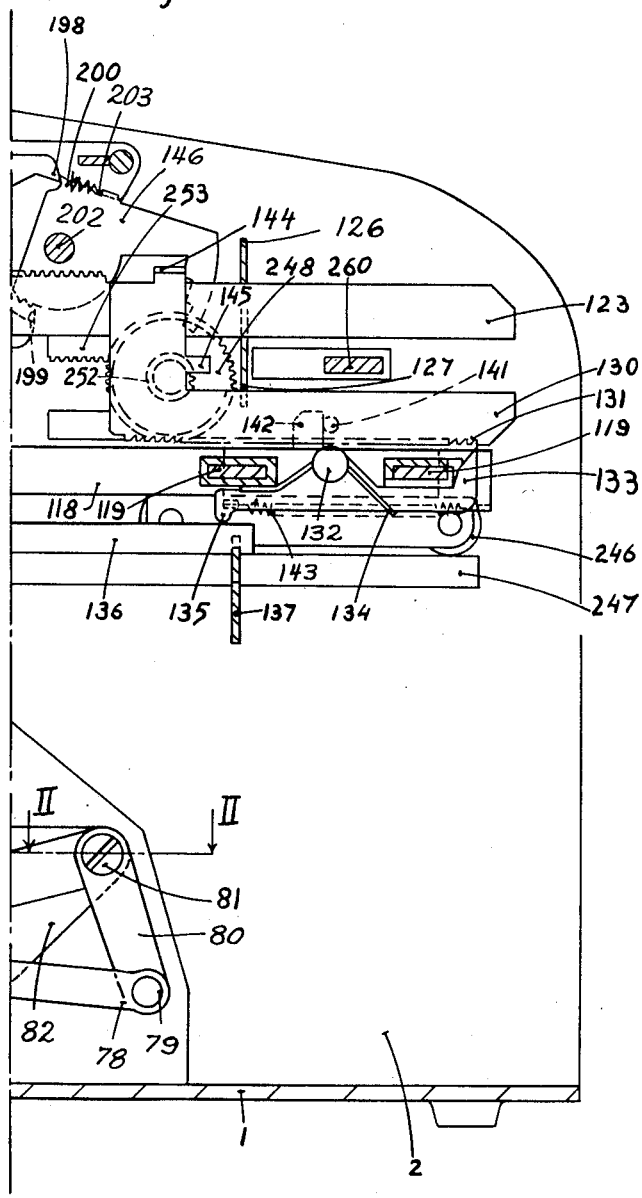

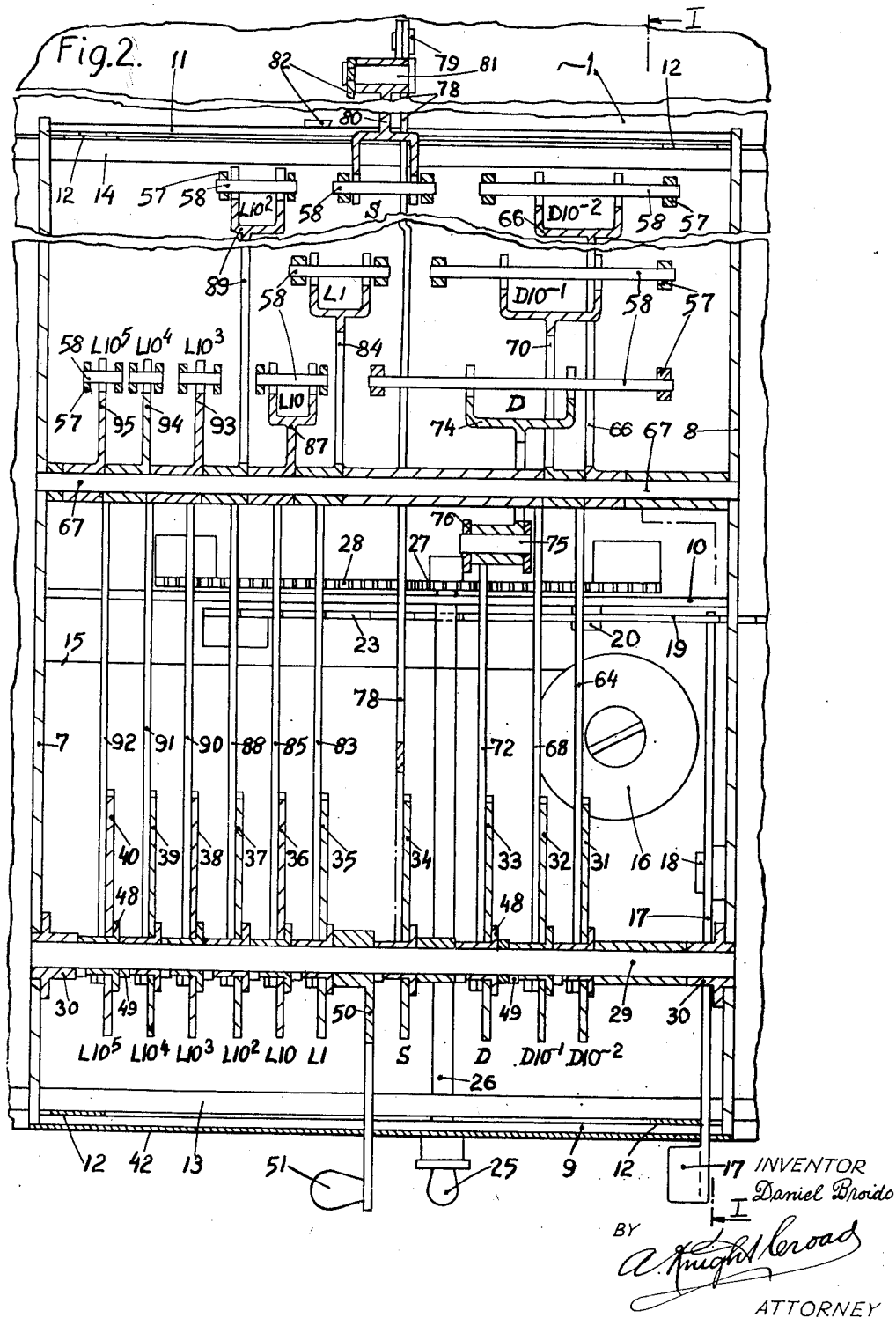

D. BROIDO 2,501,930

REGISTERING DEVICE

Filed March 21, 1947

INVENTOR
Daniel Broido.

BY
A. Knight Broad
ATTORNEY

March 28, 1950 D. BROIDO 2,501,930
REGISTERING DEVICE
Filed March 21, 1947 17 Sheets-Sheet 9

INVENTOR
Daniel Broido
BY A. Knight Broad
ATTORNEY

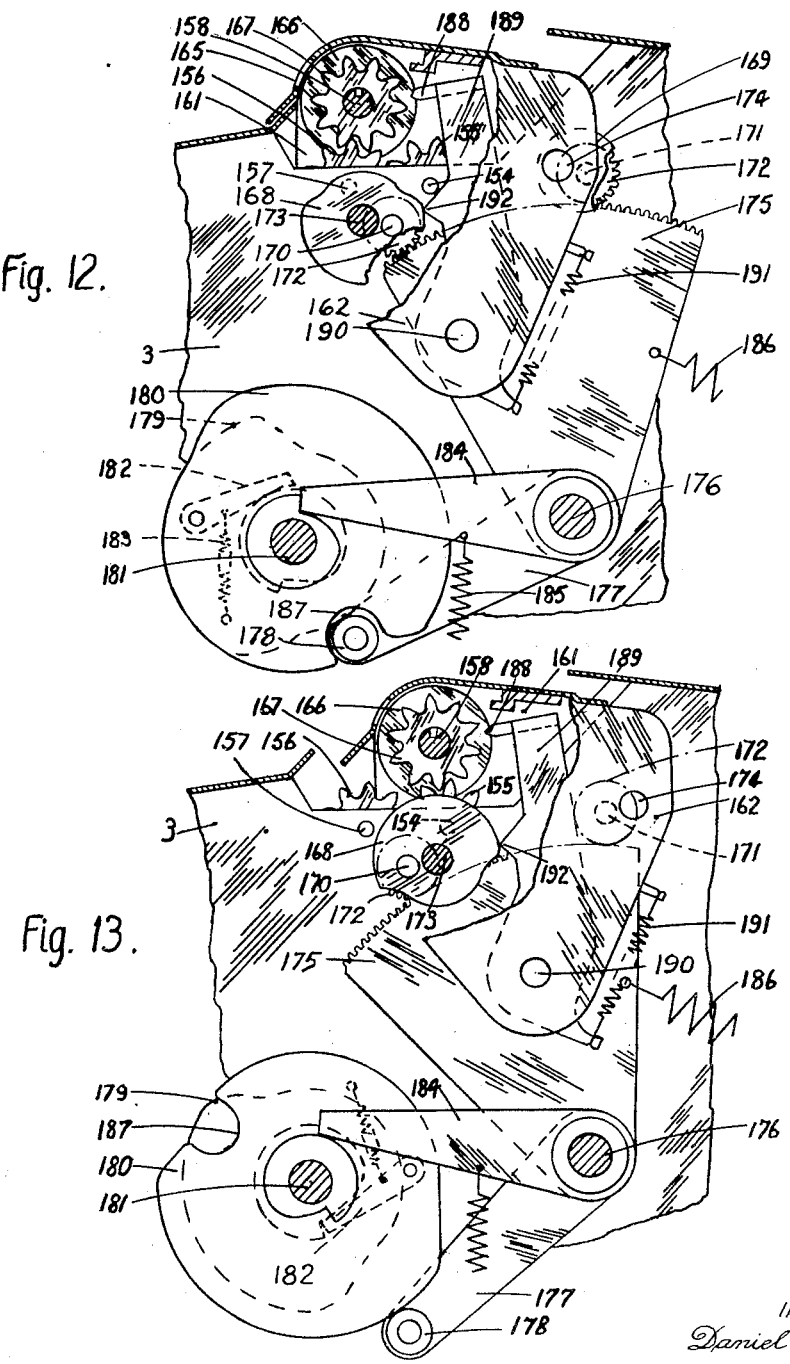

March 28, 1950     D. BROIDO     2,501,930
REGISTERING DEVICE

Filed March 21, 1947     17 Sheets-Sheet 11

INVENTOR
Daniel Broido
BY
ATTORNEY

March 28, 1950      D. BROIDO      2,501,930
REGISTERING DEVICE
Filed March 21, 1947      17 Sheets-Sheet 13
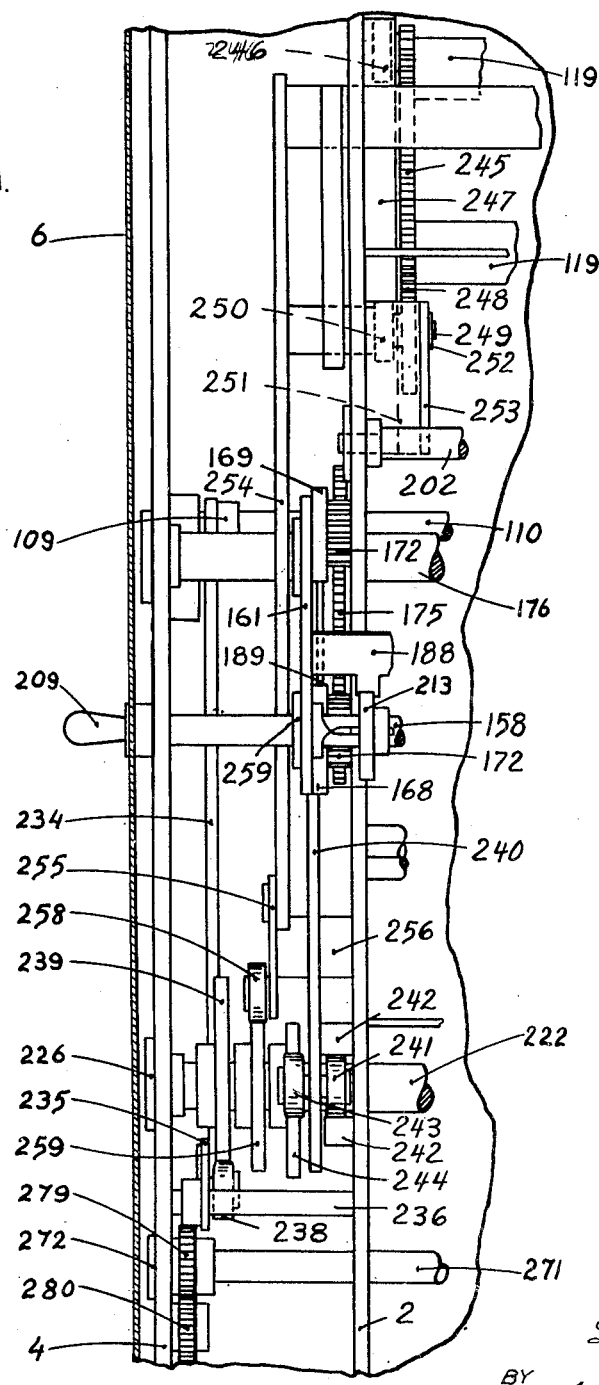
INVENTOR
Daniel Broido
BY
A. Knight Croad
ATTORNEY

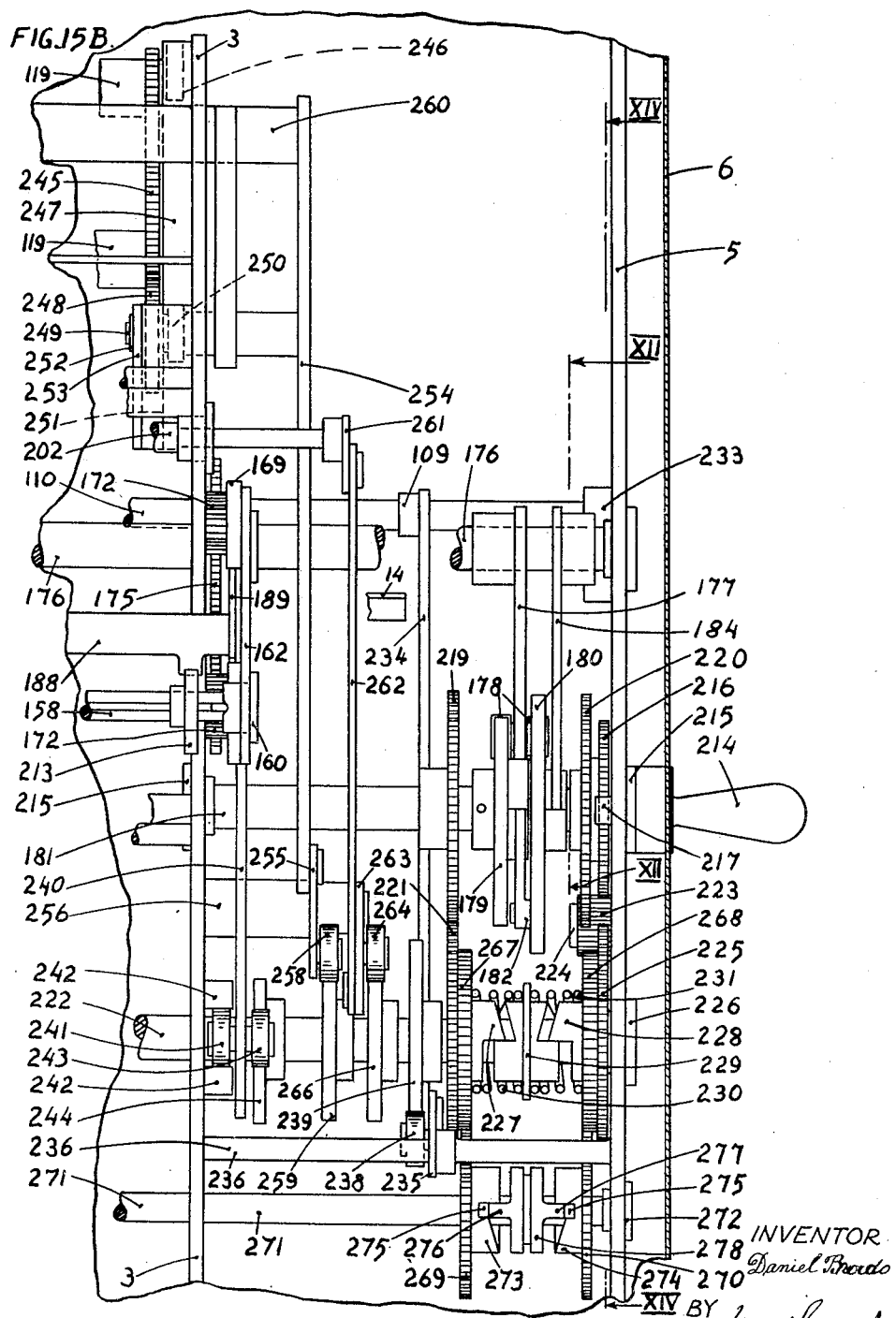

March 28, 1950 D. BROIDO 2,501,930
REGISTERING DEVICE
Filed March 21, 1947 17 Sheets-Sheet 15
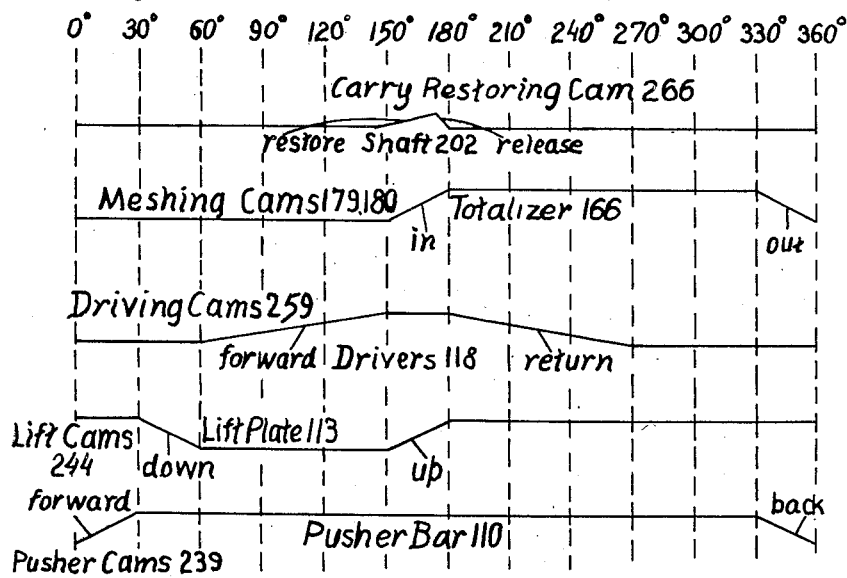
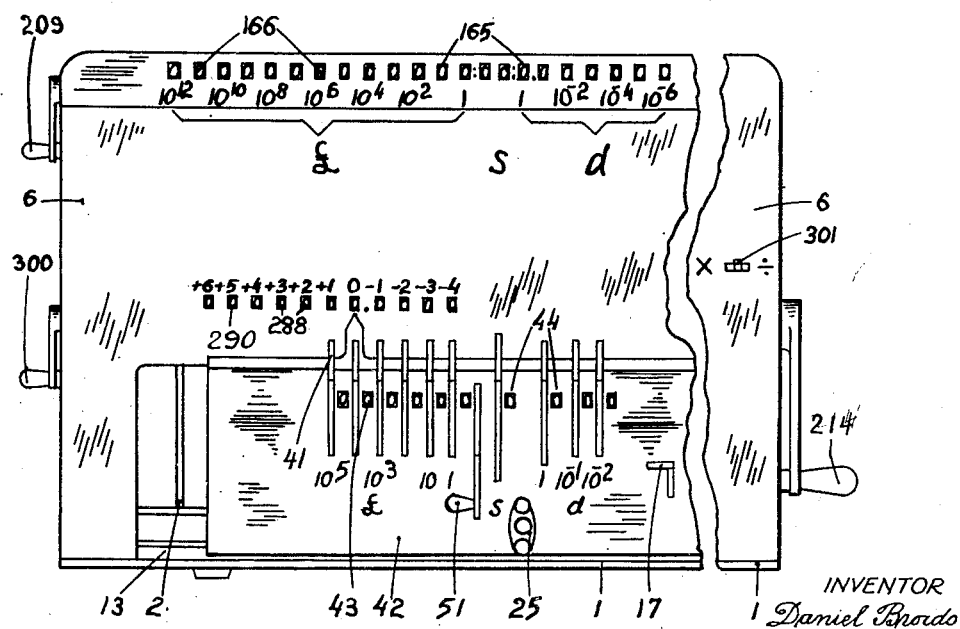
INVENTOR
Daniel Broido
BY
ATTORNEY March 28, 1950     D. BROIDO     2,501,930
REGISTERING DEVICE
Filed March 21, 1947     17 Sheets—Sheet 16
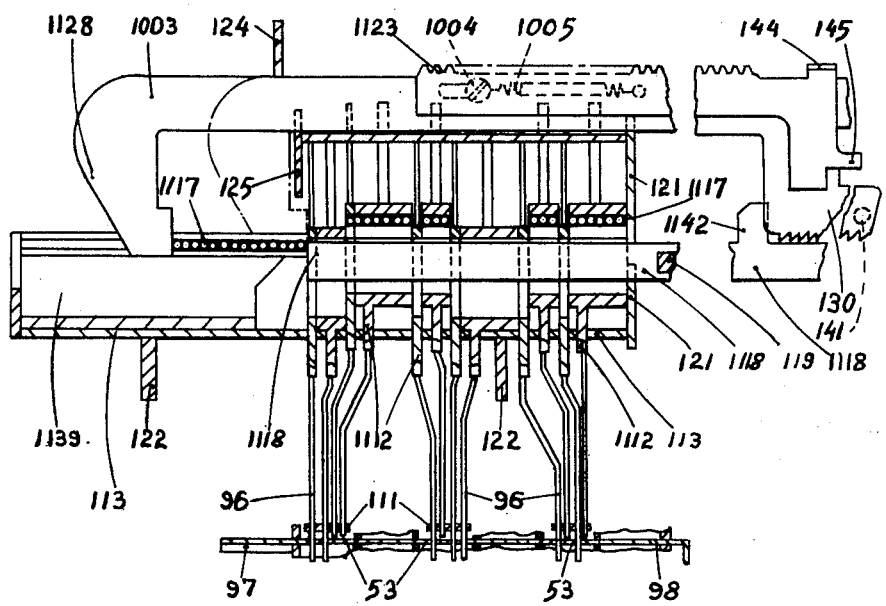
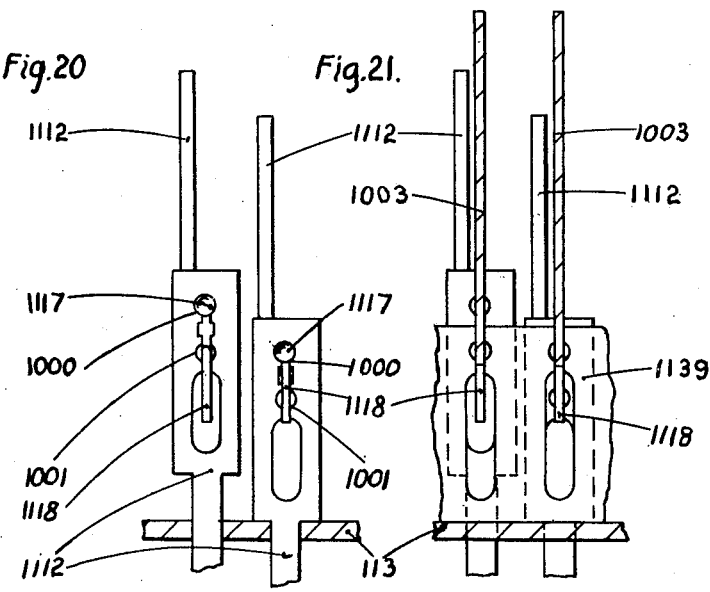
INVENTOR
Daniel Broido
BY
A. Knight Croad
ATTORNEY March 28, 1950          D. BROIDO          2,501,930
REGISTERING DEVICE
Filed March 21, 1947          17 Sheets-Sheet 17
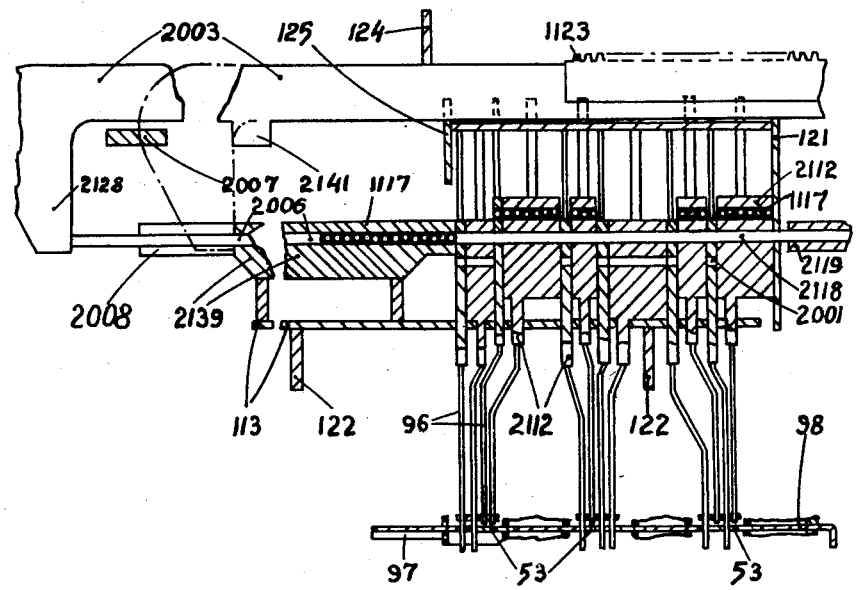
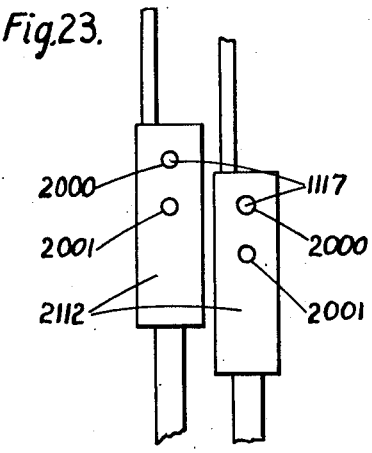
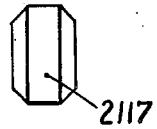
INVENTOR
Daniel Broido
BY
A. Knight Croad
ATTORNEY Patented Mar. 28, 1950

2,501,930

UNITED STATES PATENT OFFICE 2,501,930

REGISTERING DEVICE

Daniel Broido, Cockfosters, near Barnet, England

Application March 21, 1947, Serial No. 736,130
In Great Britain April 4, 1946

15 Claims. (Cl. 235—61)

1

This invention relates to registering devices, particularly to totalizing registers of calculating, adding, accounting, tabulating, and the like machines. More specifically stated, it relates to the value-entering mechanisms of totalizing registers.

It is frequently desirable to enter into a totalizing register a plurality of different numerical values simultaneously, and for this purpose it has been previously suggested to use differential mechanisms, for instance of the rack-and-gear type, or of the bevel-pinion type, or of the sun-and-planet gear type, and so forth. These mechanisms work satisfactorily when the number of input values to be entered into the totalizer simultaneously is small, but difficulties arise when the number of input values increases. In mechanisms of this type it is necessary to couple every two input members to a "first output" member, then to couple every two "first output" members to a "second output" member, and so forth, until the final output member is reached. This considerably increases the number of components, increases friction and backlash, and also considerably reduces the movement of the output member as compared with that of an input member.

The main object of the present invention is to devise a differential value-entering mechanism for totalizing registers which, while being easy to manufacture, compact, and accurate in operation, would permit simultaneous readout and speedy entry of a plurality of values into the same registering elements of the said totalizers.

Another object is to devise a differential value-entering mechanism wherein the output movement is equal to the number of input movements.

Another object is to devise a sensing and value-entering differential mechanism wherein any value entered during the sensing operation produces a corresponding movement of the final output member during the subsequent driving operation, without any intermediary output members.

Yet a further object is to devise a high-speed differential value-entering mechanism wherein the output member is positively driven by a driving member making the same predetermined stroke during each operating cycle irrespective of the differential movement of the said output member.

Another object is to devise a differential value-entering mechanism wherein the output member is positively driven by a transmission medium brought into operative association with a driving member having a predetermined stroke, the amount of movement of the output member being equal to the total quantity of the transmission medium brought into operative association with said driving member.

A further object is to devise a high-speed differential value-entering mechanism having a minimum of springs, and also having means for prevention of overthrow and rebound of the output members operating the totalizing register.

Other objects will become apparent as the description proceeds.

With these objects in view, a differential value-entering mechanism for a totalizing register made according to the present invention comprises one conduit for each denominational registering element of the totalizer, each conduit comprising a first section normally filled with a transmission medium readily divisable into a plurality of elementary quantities, a second section for temporary storing quantities of said transmission medium and a third section serving as a return passage from the second section to the first section, a plurality of input members operatively associated with each conduit and each adapted to cause a predetermined quantity of said transmission medium to move from the first section to the second section of the respective conduit, driving means for driving the said transmission medium from the second sections into the third sections and thence back into the first sections of the said conduits, means for reciprocating the said driving means through a predetermined stroke during each operating cycle, output members each associated with one of said conduits and adapted to be driven by said transmission medium, while the latter is being driven by said driving means, through a distance proportionate to the total quantity of said transmission medium previously moved into the second section of the respective conduit, means for restoring the said input and output members, and means for coupling the denominational registering elements of the totalizer to the respective output members.

From another aspect, a sensing and value-entering differential mechanism made according to the present invention comprises one conduit for each denominational registering element of a totalizing register, each conduit comprising a first section normally filled with a transmission medium readily divisable into a plurality of elementary quantities, a second section for temporary storing quantities of said transmission medium, and a third section serving as a return passage from the second section to the first section, a plurality of sensing members associated with each of said conduits and each adapted to sense a certain numerical value to be entered into the respective denominational registering element of the totalizer, input members each operatively associated with one of said sensing members and adapted to move a quantity of said transmission medium proportionate to the sensed value from the first section into the second section of the respective conduit, driving means for driving the transmission medium from the second sections into the third sections and thence back into the first sections of said conduits, means for reciprocating the said driving means through a predetermined stroke during each operating cycle, output members each associated with one of said conduits and adapted to be driven by the said transmission medium, while the latter is being driven by said driving means, through a distance proportionate to the total quantity of said transmission medium previously moved into the second section of the respective conduit, means for restoring the said sensing members, input members, and output members, and means for coupling the output members to the respective denominational registering elements of the totalizer.

The invention may be applied to any machine having a totalizing register, such as a calculating, adding, or like machine in order to achieve, in an efficient manner, a simultaneous read-out and entry of a plurality of numerical values. In the preferred embodiment about to be described, the invention is applied to a sterling calculating machine, but it is not limited to the sterling system and may be used for any numerical system, including the decimal system.

In the accompanying drawings illustrating a calculating machine comprising an embodiment of the present invention—

Figures 1A, 1B, 1C together constitute a vertical section on line I—I of Figures 2 and 7.

Figure 2 is a horizontal section approximately on line II—II of Figures 1A, 1B, 1C showing the set-up mechanism, Figure 3 is a horizontal section on line III—III of Figure 1B showing the pusher frame.

Figure 4 is a fragmentary section on line IV—IV of Figure 1A showing the shift rack.

Figure 5 shows perforated plates of the front bank,

Figure 6 illustrates diagrammatically the co-ordination of the carriage mechanism with the sensing mechanism.

Figure 8 is a fragmentary section taken on line VIII—VIII of Figure 1B to illustrate, on a larger scale, various positions of sensing elements, Figure 9 is a similar section on line IX—IX of Figure 1B.

Figure 12 is a vertical section on line XII—XII of Figure 15B showing the totalizing register and associated mechanism during an additive operation.

Figure 13 similarly shows the positions of parts during a subtractive operation.

Figure 14A:
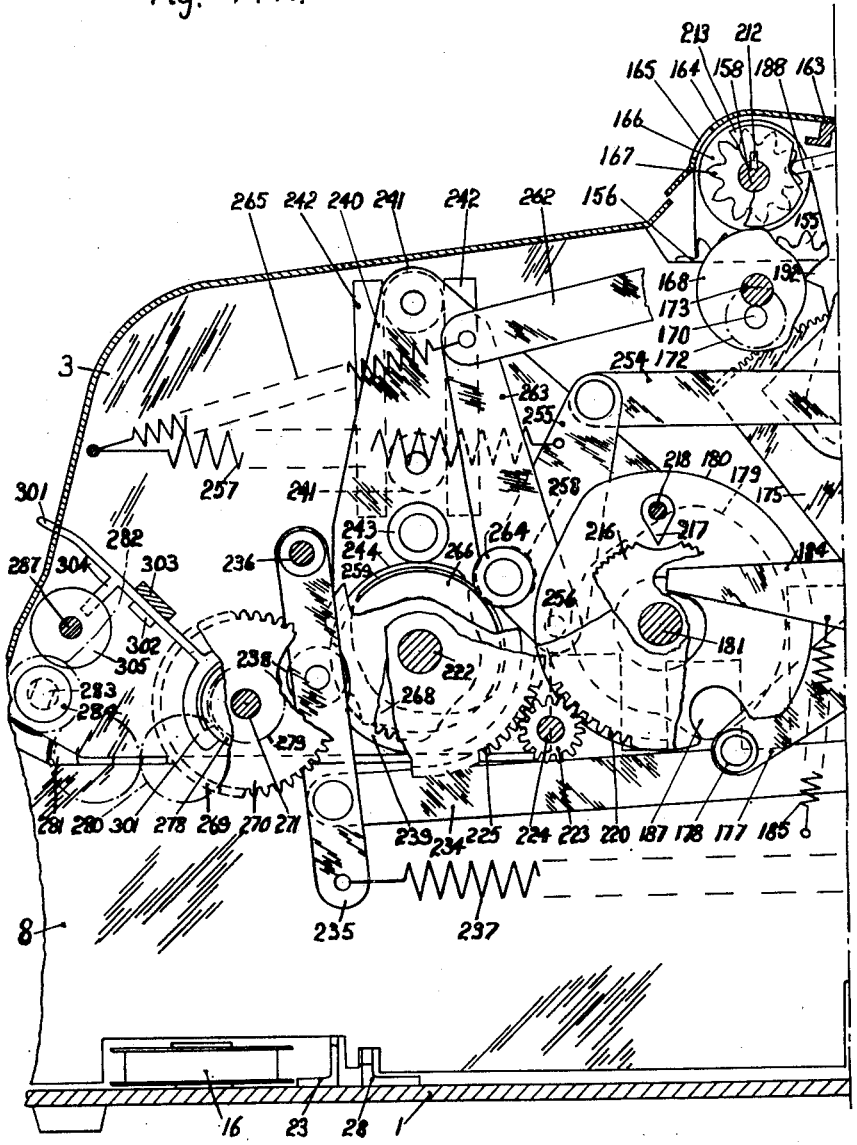

Figures 14A and 14B together constitute a vertical section on line XIV—XIV of Figure 15B showing the driving and operating mechanism.

Figures 15A and 15B together constitute a plan view, with machine cover and certain parts removed for the sake of clearness, of the driving and operating mechanism arranged on the left-hand side and the right hand side of the machine, respectively.

Figure 16 is a timing chart.

Figure 7:
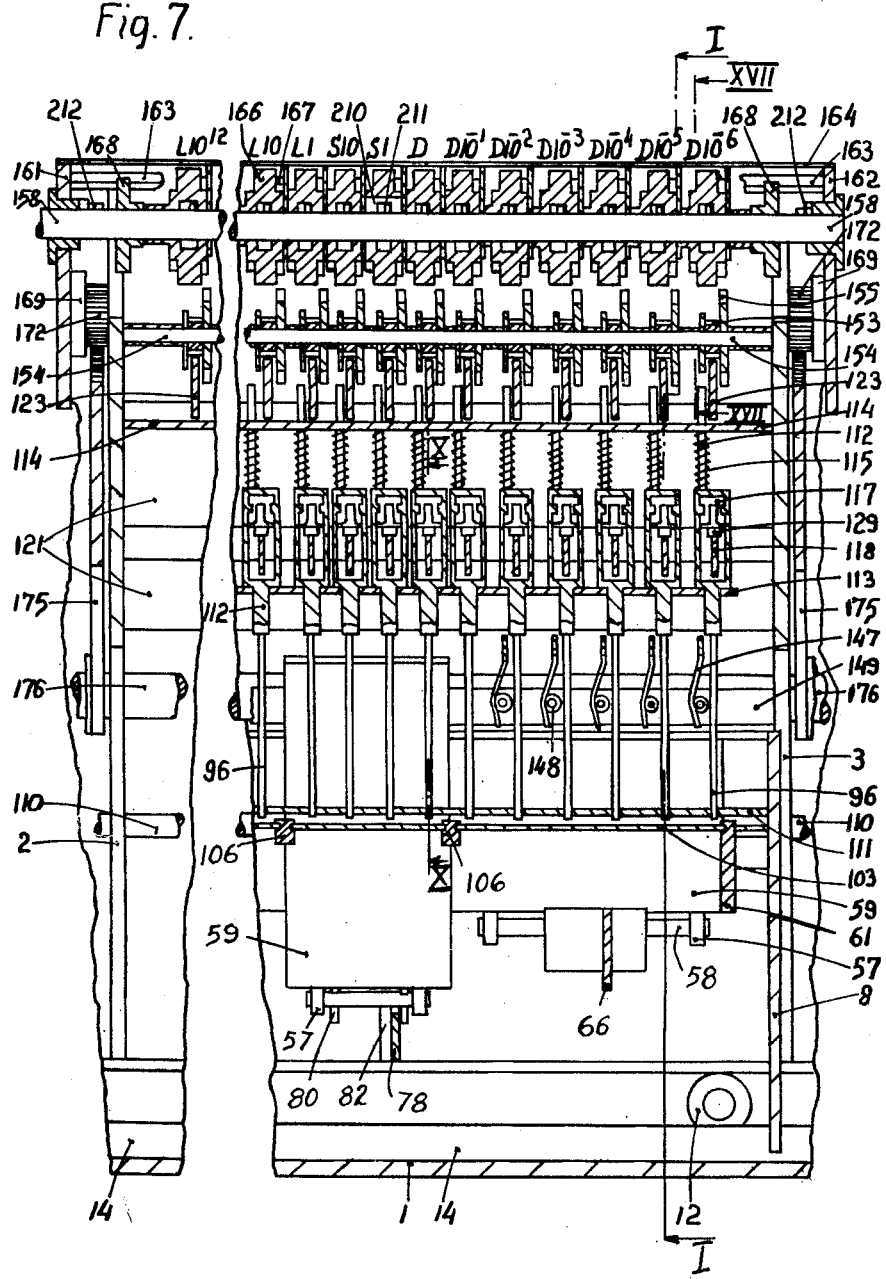
Figure 7 is a vertical section on line VII—VII of Figure 1B.
Figures 14, 17:
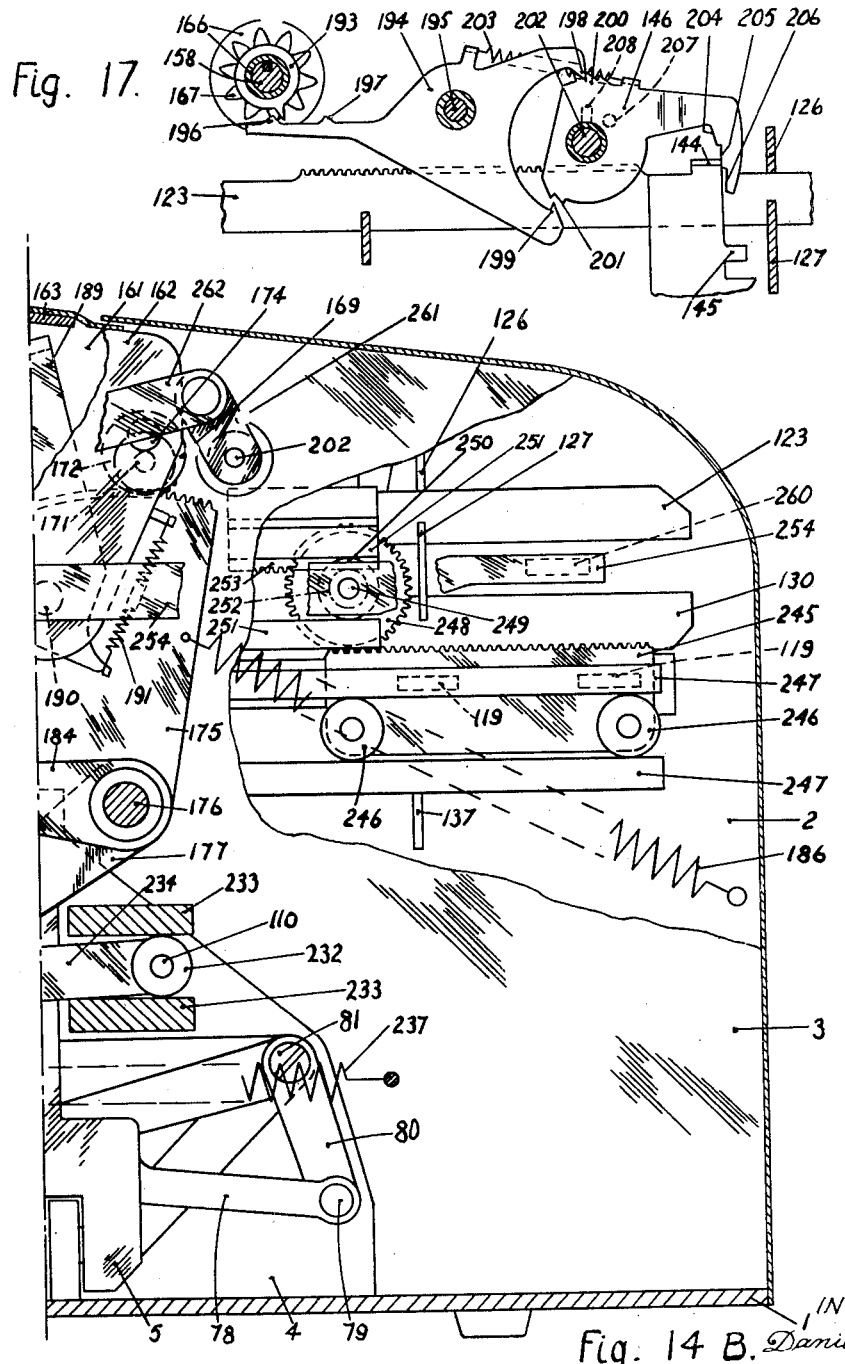

Figure 17 is a fragmentary section on line XVII—XVII of Figure 7 showing details of the carry mechanism.

Fig. 18 is a front elevation of the machine on a smaller scale.

Figure 10:
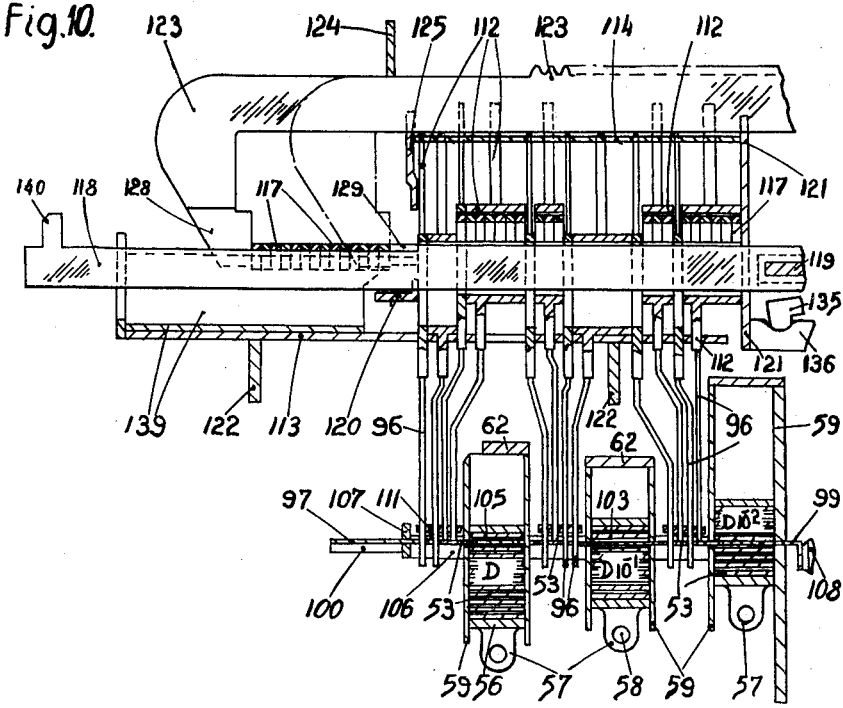
Figure 10 is a section on line X—X of Figure 7 showing the position of parts at the end of forward stroke of the driving mechanism.

Figure 19, similar to Figure 10, shows positions of parts of a modification at the end of forward stroke.

Figure 20, similar to Figure 8, shows sensing elements of this modification.

Figure 21, similar to Figure 9, shows sensing elements and the lift rails of this modification.

Figure 22, similar to Figures 10 and 19, shows parts of another modification.

Figure 23, similar to Figure 8, shows sensing elements of this second modification, and Figure 24 shows in front elevation, and Figure 25 in side elevation, another form of transmission elements on a larger scale.

General arrangement

The machine comprises, generally, a supporting structure, a set-up mechanism, a sensing and value-entering mechanism, a totalising register, a revolution or multiplier register, a driving and operating mechanism, and associated devices. The general arrangement of the machine is shown in Figure 18, wherein the set-up mechanism is generally indicated as at 41, the totalizing register as at 166 and the revolution register as at 288.

The supporting structure comprises a base plate 1, two inner side frames 2, 3, Figure 15A, 15B, and two outer side frames 4, 5, interconnected by a number of crossbars to form a rigid structure to which is fixed the machine cover 6.

Set-up mechanism

Figure 1A:
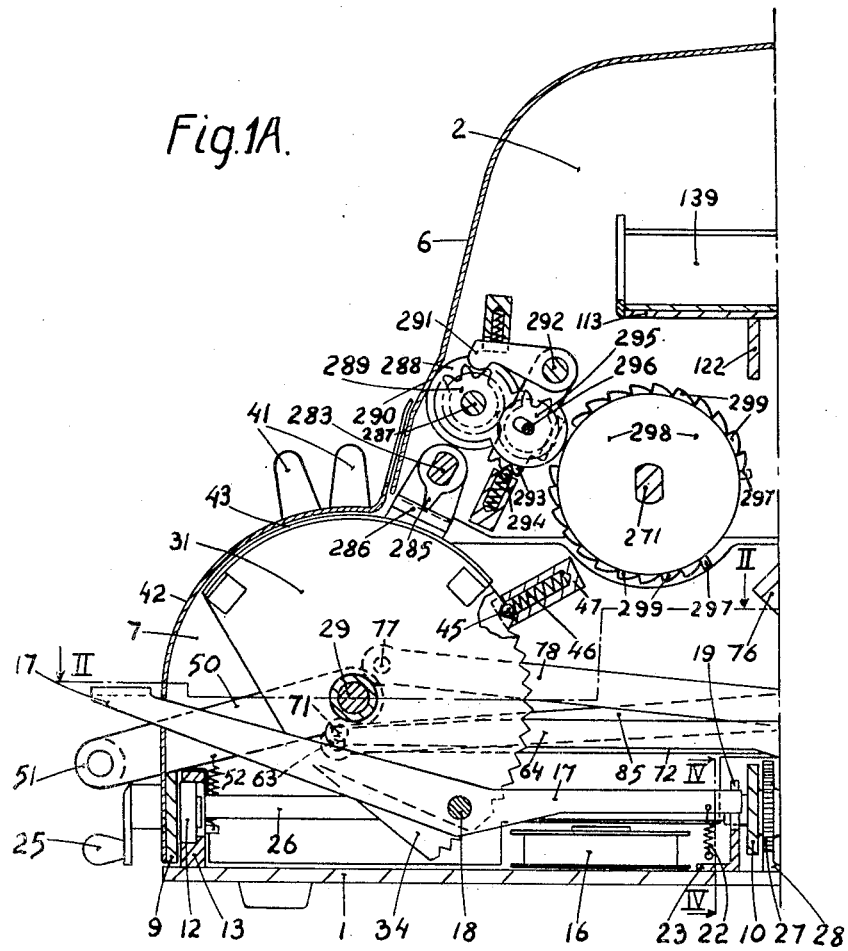

A carriage formed by two side plates 7, 8, Figure 2, interconnected by crossbars such as 9, 10, 11, Figure 1A, 1B, is arranged to move between the outer machine frames 4, 5 on rollers 12 running in rails 13, 14 fixed to base plate 1. A spring 15 in barrel 16 tends to pull the carriage to the right, as viewed in Figure 2. A shift lever 17 pivoted at 18 in carriage plate 8 engages a slot in an escapement pawl 19 pivoted at 20, Figure 4, in crossbar 10. Tooth 21 on pawl 18 is normally caused by a spring 22, Figure 1A, to engage a toothed rack 23 fixed to base plate 1. When the forward end of shift lever 17 is depressed, its rear end rocks the pawl 19 counter-clockwise as viewed in Figure 4, so that tooth 21 is disengaged from rack 23 and the carriage is moved by spring 15 approximately a half-tooth space to the right, whereupon a second tooth 24 on pawl 19 engages rack 23. When the shift lever 17 is released, it is restored by spring 22; pawl 19 is also restored and tooth 24 is disengaged from rack 23; the carriage completes a one-space movement to the right, and tooth 21 re-engages rack 23.

The carriage is shiftable to the left by a handwheel 25 fixed to a shaft 26, Figure 1A, journalled in crossbars 9, 10. Fixed to shaft 26 is a gear 27 meshing with a rack 28 secured to base plate 1.

A shaft 29, Figures 1A and 2, is journalled in bearings 30 in carriage plate 7, 8. Ten setting discs 31–40, one for each set-up denomination of the machine capacity, are rotatably mounted on shaft 29. Setting disc 31 is associated with hundredths-of-penny denomination ($D10^{-2}$ for short), disc 32 with tenths-of-penny ($D10^{-1}$), disc 33 with pence (D), disc 34 with shillings (S), and discs 35–40 with units, tens, etc., of pounds (L1—$L10^5$). Each disc 31–40 has a finger tip 41, Figure 1A, protruding through a slot in carriage cover 42, and a numeral strip 43 with numerals 0–9 or 0–11 for pence, or 0–19 for shillings, respectively. Numerals on strips 43 are visible through apertures 44 in carriage cover 42, Figure 1B; furthermore, the carriage cover may be marked with appropriate numerals (not shown) along the slots for finger tips 41. Each disc 31–40 has locating teeth co-acting with a ball 45, Figure 1A, biased by spring 46 in a housing 47.

Each setting disc 31–40 is mounted on a boss 48, Figure 2, which has a recess or slot engaged by a pin 49 fixed to shaft 29; these slots are sufficiently long to allow for the maximum setting movement of discs 31–40. A bracket 50 fixed to shaft 29 protrudes through a slot in carriage cover 42; it has a clearing knob 51 and is normally pulled down by a spring 52, Figure 1A. For clearing the set-up, clearing knob 51 is pushed upwards, thus rotating the shaft 29 clockwise; pins 49 pick up their associated discs 31–40 and restore them to their initial positions shown in Figure 1A, whereupon clearing lever 50 is restored by its spring 52.

The setting movement of discs 31–40 is utilised to position perforated plates generally designated 53 in Figure 1B and more fully described hereafter. A set of plates 53 is operatively associated with each setting disc 31–40, the number of plates 53 within each set corresponding to the number of digital values in the respective denomination. Thus, the sets associated with setting discs 31, 32 ($D10^{-2}$, $D10^{-1}$) and 35–40 (L1—$L10^5$) each comprise ten plates 53, one for each digit 0–9; the set associated with setting disc 33 (D) has twelve plates 53, one for each pence value 0–11; and the set associated with disc 34 (S) has twenty plates 53, one for each shillings value 0–19. As shown in Figures 1B and 3, plates 53 of each set are mounted in a slide formed by rigidly interconnected end plates 54, Figure 3, top plate 55 and bottom plate 56 which has brackets 57 fixedly supporting a pin 58. Each slide is mounted for independent vertical movement in pairs of guides 59 interconnected by end plates 60, 61 and top plates 62 and secured to the carriage structure 7, 8. There are three pairs or banks of guides 59, the front bank containing plates 53 associated with D, L10, $L10^3$, $L10^4$ and $L10^5$ denominations, as indicated in Figure 3; the middle bank containing plates 53 of the $D10^{-1}$ and L1 denominations; and the rear bank containing perforated plates 53 of the $D10^{-2}$, S, and $L10^2$ denominations.

Settings discs 31–40 are connected with their respective slides in the manner shown in Figures 1A, 1B, 1C, and 2. Pivoted at 63 in disc 31 is a connecting rod 64 linked at 65 to a fork 66 pivoted on a shaft 67 fixedly mounted in carriage structure 7, 8. Fork 66 is slotted to engage pin 58 of the $D10^{-2}$ slide in the rear bank; front guide 59 is slotted to allow for free movement of the fork. Similarly linked to disc 32 is a connecting rod 68 linked at 69 to fork 70 rockable on shaft 67; fork 70 is slotted to engage pin 58 of the $D10^{-1}$ slide in the middle bank. Setting disc 33 is linked at 71 to a connecting rod 72 linked at 73 to a fork 74 pivoted at 75 in a bracket 76 secured to the carriage structure; fork 74 engages pin 58 of the D slide in the front bank. Setting disc 34 is linked at 77 to a connecting rod 78 linked at 79 to a fork 80 pivoted at 81 in a bracket 82 secured to the carriage structure; fork 81 engages pin 58 of the S slide in the rear bank. Disc 35 is linked as at 63 to a connecting rod 83 linked as at 69 to a fork 84 pivoted on shaft 67 and engaging the pin 58 of the L1 slide in the middle bank. Disc 36 is linked as at 63 to a connecting rod 85 linked at 86 to a fork 87 pivoted on shaft 67 and engaging the pin 58 of the L10 slide in the front bank. Disc 37 is linked as at 63 to a connecting rod 88 linked as at 65 to a fork 89 pivoted on shaft 67 and engaging the pin 58 of the $L10^2$ slide in the rear bank. Finally, setting discs 38, 39, 40 are linked as at 63 to connecting rods 90, 91, 92 respectively, which are linked as at 86 to rockers 93, 94, 95 respectively; these rockers are pivoted on shaft 67 and engage pins 58 of slides $L10^3$, $L10^4$, $L10^5$, respectively, in the front bank of guides 59.

In this manner, when discs 31–40 are set so that the required numerals appear in the apertures 44, the associated slides containing the perforated plates 53 are positioned accordingly. It may be noted that while the setting discs rotate around their shaft 29, the respective slides move vertically in a straight line. In order to produce equal steps of slide movement for each rotary step of discs 31–40, the locating teeth on the discs may be spaced accordingly.

After the slides have been positioned vertically by setting the discs 31–40, the selected perforated plates 53 must be moved horizontally into operative association with sensing pins 96, fully described hereafter. For this purpose each plate 53 is slidably mounted in slots formed in end plates 54 of each slide assembly. A pusher frame is mounted for horizontal movement in line with the top (0) plates 53 when the slides are in the lowest positions (shown in Figure 1B). This pusher frame can enter the slides through slots in guides 59 and thus push the selected plates 53 forwardly (to the left as viewed in Figure 1B) into the working position shown in Figures 10 and 11, to be sensed by pins 96. The pusher frame, Figures 3 and 1B, comprises a forward plate 97, a middle plate 98, and a rear plate 99, held together by strips 100; it further comprises floating plates 101, 102, 103, 104, 105 guided in slots of the slide end plates 54. Further, floating plates 101–105, middle plate 98, and forward plate 97 are guided in slots on the sides of posts 106 secured to guides 59. Forward plate 97 is also supported in a slot in a double crossbar 107 fixed to the carriage structure. Thus, each plate 53 when aligned with the pusher frame is held between the elements comprising the pusher frame, which are cut out to clear the slide end plates 54. Rear plate 99 of the pusher frame has two brackets 108 with bearings 109 through which passes a rod 110. When this rod 110 is moved forward as will be described in due course, the pusher frame causes those perforated plates 53 which are aligned with it to move forward into the working position; when the pusher frame is restored by its rod 110, it restores the sensed plates 53 into the initial position within the respective slides.

Plates 53 are perforated to represent the decimal multiples of the set-up values as fully described in my British patent specification No. 566,942; while in the prior specification the various numerical values are represented by notches of corresponding depth, in the present case these same values are represented by holes in certain positions. There are many known positional codes for numerical representation which may be used; it is preferred to use a four-point code 1, 3, 1, 6. In order to illustrate this arrangement, plates 53 of the front bank are shown in Figure 5. Symbols $L10^5$—D along the top edge indicate the sets of plates 53 associated with the respective denominations, while numerals 0–11 along the left-hand edge indicate the digital values associated with each row of plates 53; the dotted vertical line approximately in the middle of the drawing indicates the position of the L1 sensing pin 96. A hole may be placed along any one line 1, 3, 1, 6 as indicated at 1 row of plates 53. Thus, the hole in the 1 plate of the $L10^5$ set represents the digit 1, since it is positioned on the 1 line. The two holes near the right-hand edge of the 1 plate of the D set represent together the digit 4, since they are positioned on lines 1 and 3 respectively, and so forth. Thus, up to four holes arranged vertically (as seen in plan view of Figure 5) represent, in combination, any digital value up to 11. Plates 53 of the middle and rear bank are not shown in detail, as the arrangement of holes is the same for all banks; the 0 plates 53 may be seen in Figure 3.

It may be mentioned here that while the 1, 3, 1, 6, positional code is of advantage in a sterling machine, a 1, 2, 1, 5 code is better for purely decimal calculations, as will be more clearly understood hereafter. However, any suitable positional code may be used.

The co-operation of perforated plates 53 with sensing pins 96 is shown diagrammatically in Figure 6, which illustrates the set-up of £141,010;0;3d. on plates 53 of the front bank. There are four sensing pins 96 (shown as single thick vertical lines) associated with each result denomination (as indicated by symbols $L10^{10}$—$D10^{-3}$ in the top part and $L10^4$—$D10^{-6}$ in the bottom part of the drawing) for the purpose of sensing this bank of plates 53. The top line of perforated plates 53 illustrates the initial position (0) of the carriage. It will be seen that one of the D sensing pins will enter a hole on the 3 line, thus registering 3d.; one of L10 pins will enter a hole on line 1 to register £10; one of $L10^3$ pins will enter a hole on line 1 to register £1,000; two $L10^4$ pins will enter holes on lines 1, 3 to register £40,000; and a pin 96 associated with $L10^5$ denomination will enter a hole on line 1 to register £100,000. Thus, the total sensed by pins 96 will be £141,010;0;3d. The next row (+1) of plates 53 shows their position when the carriage has been shifted one step to the left, which is equivalent to multiplication by 10. The amounts registered by sensing pins 96 are (from left to right): 1 on $L10^6$, 1, 3 on $L10^5$; 1 on $L10^4$; 1 on $L10^2$; 1, 1 on S1; and 6 on D, giving a total of £1,410,100;2;6d. The total amount registered in carriage position +2 (multiplication by 100) is £14,101,001;5;0d; in position +3 (multiplication by 1000 or $10^3$) £141,010,012;10;0d.; in position +4 (multiplication by $10^4$) £1,430,100,125;0;0d.; and in position +5 (multiplication by $10^5$) the total is £14,101,001,250;0;0d. The shift of the carriage into position +6 (corresponding to multiplication by $10^6$) is not illustrated in Figure 6, as it does not show the last left-hand group of sensing pins 96 associated with $L10^{11}$ denomination which becomes active in this carriage position.

The lower part of Figure 6 illustrates the plates 53 in the percentage positions of the carriage, namely when it is shifted to the right from the initial position 0. When the carriage is shifted to position —1 (corresponding to multiplication by $\frac{1}{10}$ or 10% or $10^{-1}$), the amounts registered will be seen as 1 ($L10^4$); 1, 3 ($L10^3$); 1 ($L10^2$); 1 (L1); 3 ($D10^{-1}$), giving a total of £14,101;0;0.3d. The amount registered in position —2 (multiplication by $1/100$ or 1% or $10^{-2}$) is £1,410;2;0.03d.; in position —3 (multiplication by 0.1% or $10^{-3}$) £141;0;2.403d.; and finally in position —4 (multiplication by 0.01% or $10^{-4}$) £14;2;0.2403d.

It may be mentioned here that, whilst a hole representing a pounds digit may be sensed by pins 96 of any pounds denomination, it will never be aligned with sensing pins or the shillings, pence, or fractions-of-penny denominations, and vice versa. This is achieved, as fully described in the above mentioned prior specification, by an unequal spacing of holes representing values of the various denominations, and by a corresponding spacing of the sensing pins 96. As may be seen from Figure 6, the spacing between sensing pins of adjacent pounds denominations is constant and equal to the carriage step; this applies also to pins associated with fractions-of-penny. However, the spacing between sensing pins associated with L1, S10, S1, D, and $D10^{-1}$ denominations is smaller than the carriage step. Thus, a hole representing a units-of-pounds (L1) digit will not be aligned with tens-of-shillings (S10) pins when the carriage is stepped to the right, and so forth.

*Sensing and value-entering mechanism*

As generally indicated by thick lines 96 in Figure 6, there is a group of sensing pins associated with each result denomination. As shown in Figure 1B, each group of pins 96 comprises three sets, one for each bank of perforated plates 53, there being four pins 96 within each set and twelve pins 96 within each denominational group. The four pins of each set are aligned, respectively, with lines 1, 3, 1, 6 shown in Figures 5, 6 when the plates 53 are in the sensing position. Whilst the mechanism about to be described comprises three sets of sensing pins 96 in each denominational group and thus is adapted for a three-digit readout, the invention is not limited to this readout, as the number of sets of pins 96 associated with each result denomination may be increased as required; for instance, in the machine of the type disclosed in my prior British patent specification No. 575,324 which requires a five digit-readout the number of sets of pins 96 within each denominational group may be increased to five, and so forth.

Figure 11:
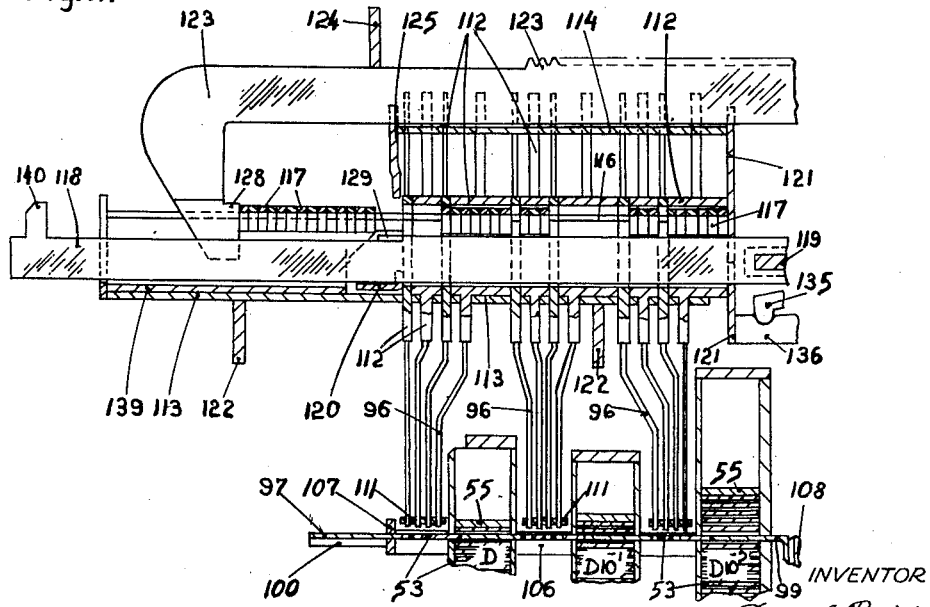
Figure 11 is a similar section illustrating the positions of parts at the beginning of return stroke.

Sensing pins 96 are mounted for vertical movement in guides 111, Figures 1B, 10, 11, fixed to the machine structure 2, 3. Each pin 96 is fixed to, or forms a part of, a slide 112 mounted for vertical movement in a lift plate 113 (to be fully described hereafter) and in a guide 114 secured to the machine structure. Each slide 112 is biased downwards by a spring 115, Figure 7. The formation of slides 112 is clearly shown in Figure 8. They are hollow inside and have small shoulders 116 on which are suspended what may be termed transmission elements or elementary plates 117. Elements 117 are of standard thickness, and slides 112 are of such thickness as to accommodate respectively, 1, 3, 1, or 6 elements 117 each, as clearly shown in Figures 1B, 10, 11. The thickness of a slide 112 having a pin 96 adapted to sense the 1 line of holes in plates 53 is substantially equal to the thickness of one element 117; the thickness of a slide 112 adapted to sense the 3 line of holes is substantially equal to thickness of three elements 117; the thickness of a slide 112 adapted to sense, by means of its pin 96, the 6 line of holes in plates 53 is sufficient to accommodate six elements 117. Thus, the number of elements 117 contained within each slide 112 is equal to the digital values which this slide is supposed to sense. The hollow portions of all slides 112 of a denominational group practically touch each other to form a channel or conduit for the transmission elements 117.

A driver bar 118 protrudes through all the slides 112 of a denominational group. All drivers 118 are fixed to two crossbars 119, Figure 1C, which extend across the machine and can be reciprocated through a predetermined stroke, as will be described hereafter. Drivers 118 are guided in bars 120, 121, Figure 1B, fixed to the machine structure.

Lift plate 113 is supported by, and fixed to, two crossbars 122 which extend across the machine and are lowered, as will be described hereafter, in the course of the sensing operation. Lift plate 113 normally supports the slides 112; when it is lowered, the slides 112 tend to move downwards due to their springs 115. However, only those slides 112 can move appreciably downwards, whose pins 96 encounter holes in the perforated plates 53; those sensing pins 96 which do not encounter a hole do not move appreciably, so that their slides 112 remain substantially stationary. As clearly shown on the left of Figure 8, as long as a slide 112 remains in the upper position, its element or elements 117 is or are above the driver 118. However, as shown on the right of Figure 8, when the slide 112 is in the lower position, its element or elements 117 is or are lowered on to the driver 118. Thus, as the sensing pins 96 of each denominational group enter or do not enter the holes in plates 53 in the course of the sensing operation, the associated slides 112 move downwards or not as the case may be, and a number of elements 117 are lowered on to each driver 118. This number is equal to the total value of all holes entered by sensing pins 96 of the respective denominational group.

Figure 10 shows the sensing pins of the pence (D) denominational group after sensing the amount 1¼d. or 1.25d. in the +3 carriage position, corresponding to multiplication by 1000. The first set of pins 96 associated with the front bank (on the left in Figure 10) of perforated plates 53 senses the amount 4, since 1d.×1000=£4;3;4d.; consequently, pins associated with digits 1, 3 enter the holes in D plate 53, as shown. The set of pins 96 associated with the middle bank senses the amount 3, since .2d.×1000=16/8d.; thus, pins associated with digits 1, 1, 6 drop through the holes in D10$^{-1}$ plate 53. Finally, pins 96 of the third set associated with the rear bank of plates 53, sense the amount 2, since .05d.×1000=4/2d.; thus, pins associated with digits 1, 1 enter the holes in D10$^{-2}$ plate 53. The remaining pins 96 do not encounter holes in plates 53 and remain substantially stationary. Thus, within the pence denominational group the pins 96 and slides 112 associated with following values have moved downwards: 1, 3, 1, 1, 6, 1, 1, and the total number of transmission elements 117 deposited by these slides on the driver 118 is fourteen.

A rack 123 is slidably mounted above each driver 118 in guides 124, 125, 121, Figure 1B, and 126, 127, Figure 10, secured to the machine structure. Racks 123 are each adapted to drive a denominational wheel of the totalizing register as will be fully described hereafter. Fixed to each rack 123 is a pair of arms 128 which straddle the respective driver 118, as clearly shown in Figure 9, and are sufficiently long to be engaged either by elements 117 when they straddle the driver 118 or by an abutment 129 formed on the driver.

On completion of the sensing operation the drivers 118 are moved forward (to the left as viewed in Figure 10) carrying forward those elements 117 which happen to straddle them due to previous descent of associated slides 112. In the course of the forward stroke of each driver 118 the rear element 117 which happens to straddle it will be engaged by abutment 129, while the foremost element 117 straddling the driver will engage arms 128 on rack 123, and as the driver continues on its forward stroke the abutment 129 will drive the rack 123 forward through the medium of all transmission elements 117 which happen to straddle the driver and which now fill the space between abutment 129 and arms 128. The length of stroke of the driver is such that at the end of forward movement the abutment 129 will just reach the arms 128 (rack 123 being in the normal position shown in Figure 1B) if no elements 117 happen to straddle the driver. However, if one element 117 is straddling the driver and thus is positioned between abutment 129 and arms 128, the latter together with rack 123 will be moved forward a distance equal to the thickness of this one element 117; if there are two elements 117 straddling the driver 118, rack 123 will be moved twice this distance, and so forth. Generally, the amount of movement imparted to the rack 123 by the driver 118 is equal to the standard thickness of a transmission element 117 multiplied by the number of elements 117 straddling the driver 118 as a result of the sensing operation; as this number is equal to the sum total of all values sensed by pins 96 of this particular denominational group, the movement of rack 123 is proportionate to this sum. Consequently, rack 123 will drive its associated denominational wheel of the totalizer according to the total sum of values to be entered into this wheel.

In the instance shown in Figure 10, it has been already mentioned that fourteen transmission elements 117 have descended on to the pence driver 118 in the course of the sensing operation. At the end of forward stroke of driver 118 the mechanism assumes the position illustrated in Figure 10, and it will be noted that the rack 123 has been shifted from its initial position (shown in dash-dotted lines) fourteen steps forward (to the left as viewed in Figure 10), since there are fourteen transmission elements 117 between abutment 129 on driver 118 and arms 128 on rack 123.

As stated above, the movement of racks 123 depends entirely on total thickness of transmission elements 117 between abutments 129 and arms 128. As these elements 117 can be machined very accurately, the movement of racks 123 is also very accurate, and it is characterised by absence of backlash. The movement of rack 123 may be considered to be the output movement of a differential mechanism, the input movements of which are those of transmission elements 117 descending on to the driver 118. Whereas in a conventional differential mechanism the output movement is proportionate to the sum of input movements, in the differential mechanism made according to the present invention the output movement is proportionate to the number of input movements. Since the transmission elements 117 transmit the drive from driver 118 to rack 123 they may be generally termed "transmission medium," and it may be stated that in a differential mechanism made according to the present invention the output movement is produced by, and is equal to, the transmission medium brought into operative association with a driving means making a predetermined stroke.

In order to prevent any overthrow of racks 123 at the end of forward stroke, each rack 123 has a tail 130, Figure 1C, with ratchet teeth 131. Pivoted at 132 in each driver 118 is a pawl 133 biased by a torsion spring 134 upwards but normally prevented from engaging the teeth by its tail 135 resting on a bar 136 fixed to guide 121 and a crossbar 137. Each bar 136 has a recess 138, Figure 1B, into which the tail 135 of pawl 133 drops when driver 118 reaches the end of forward stroke, as shown in Figure 10; at the same time, pawl 133 engages the teeth 131 and stops the rack 123, thus preventing any overthrow.

As the transmission elements 117 are pushed by the driver 118 to drive the racks 123 differentially, they move first within the lower part of the hollow portions of slides 112; towards the end of forward stroke the elements 117 are pushed out of the foremost slide 112 and on to rails 139, Figures 10 and 9, forming a unit fixed to the lift plate 113.

At the end of forward stroke of drivers 118, the lift plate 113 is moved upwards, by means to be described hereafter, thus restoring all slides 112 to the upper position; rails 139 move upwards with the lift plate 113, so that the transmission elements 117 which are supported by the rails 139 are now aligned with shoulders 116 in slides 112. The position of parts just prior to beginning of return stroke is shown in Figure 11. As drivers 118 move backwards, their forward lugs 140 engage the foremost (left-hand as viewed in Figure 11) element 117 of each denominational group and shift the elements 117 off the rails 139 and into the interior of slides 112; those elements 117 which have remained in the upper position during the sensing operation are driven rearwards, so that the whole mechanism is restored to its original position, shown in Figure 1B, in readiness for the next operation.

Thus, the transmission elements 117 circulate during the sensing and value-entering operation; first some of them move downwards on to drivers 118, then forward on to rails 139, then upwards into alignment with the upper portions of slides 112, and finally back into the interior of slides 112. It may be stated that the transmission elements 117 of each denominational group are arranged to circulate in a conduit comprising three sections, the first section being constituted by the upper portions of slides 112, the second section being constituted, in combination with the driver 118, by lower portions of those slides 112 which have remained stationary during the sensing operation and by upper portions of those slides 112 which have been moved downwards in the course of this operation, and the third section being constituted by rails 139, the circulation being from the first section of the conduit into the second section during the sensing operation, from the second section of the conduit into the third section during the driving operation, and from the third section of the conduit into the first section during the restoring operation. In order to facilitate this circulating movement, sharp edges and corners on elements 117, rails 139, and slides 112 should be removed.

Fixed to tail 130 of each rack 123 is a stud 141, Figure 1C, co-acting with a slide 142 mounted adjacent to the associated driver 118 on crossbars 119. A spring 143 interconnects each slide 142 with its driver 118. Tail 130 of each rack 123 has lugs 144, 145 coacting, respectively, with a stepped plate 146 and guide plate 127. In the course of return stroke of driver 118 the slide 142 engages stud 141 and restores the rack 123 until lug 144 runs up against a step on plate 146, or until lug 145 runs up against guide 127, as required for the carry operation to be described hereafter.

It may be mentioned here that when the carriage is shifted to the extreme right-hand position as viewed in Figure 18, nine denominational groups of sensing pins 96 on the left-hand side of the machine are no more aligned with the carriage. Similarly, when the carriage is in the extreme left-hand position, five denominational groups of sensing pins 96 on the right-hand side of the machine are beyond the reach of the carriage. The following means are provided to prevent the operation of these groups of sensing pins 96 when they are outside the carriage: Each of these groups of sensing pins 96 coacts with a locking plate 147, Figures 1B and 7, pivoted at each side at 148 in crossbars 149, 150, respectively, secured to machine frames 2, 3. Springs 151 tend to rock each locking plate 147 towards the respective group of sensing pins. Journalled in each locking plate 147 is a roller 152 running on the top plate 62 of the middle bank when the carriage is aligned with the roller; thus, locking plate 147 is prevented from operation, and the sensing pins 96 of this denominational group are free to descend in the course of the sensing operation. However, when the carriage is shifted so that the roller 152 drops off the plate 62, the associated locking plate 147 rocks towards the sensing pins 96 of the respective group, engages the adjacent shoulders of slides 112, and prevents their descent when the lift plate 113 descends in the course of the sensing operation.

*Totalizing register*

Each rack 123 meshes with a pinion 153, Figure 1B, rotatable on a shaft 154 secured in the machine structure. A gear 155 is fixed to each pinion 153; each gear 155 meshes with another gear 156 rotatable on a shaft 157 securedly supported in the machine structure.

Totalizer shaft 158 is journalled in bearings 159, 160, Figures 15A, 15B, in end plates 161, 162, respectively, which plates are interconnected by a crossbar 163, Figure 1B, and by the totalizer cover 164 having apertures 165. Numeral wheels 166, one for each result denomination, are visible through apertures 165 and are rotatable on shaft 158. Each numeral wheel 166 has a gear 167 adapted to mesh, during the return stroke of drivers 118, either with gear 156 (for additive calculations such as addition and multiplication) or with gear 155 (for subtractive calculations such as subtraction and division), as will be presently described.

A cam 168, Figures 12, 13, and a disc 169 are journalled at 170, 171, respectively in each side plate 2, 3. A pinion 172 is fixed to each cam 168 and disc 169, respectively. Eccentric pivots 173, 174 in cams 168 and discs 169, respectively, support the end plates 161, 162. It will be seen that as pinions 172, cams 168, and discs 169 rotate around their respective journals 170, 171, the eccentric pivots 173, 174 also rotate around journals 170, 171, respectively; consequently, the whole totalizer assembly including end plates 161, 162 and shaft 158 moves in an arc described by pivots 173, 174. When pinions 172 rotate counter-clockwise as viewed in Figures 14A, 14B, the totalizer assembly moves from position shown in Figures 1B, 14A, 14B counter-clockwise into position shown in Figure 12, so that totalizer gears 167 come to mesh with gears 156 for additive drive; when pinions 172 rotate clockwise, the totalizer assembly also moves clockwise into position shown in Figure 13, so that totalizer gears 167 come to mesh with gears 155 for subtractive drive.

Each pair of pinions 172 meshes with a gear segment 175 fixedly mounted on a shaft 176 journalled in machine frames 4, 5. Fixed to shaft 176 is a rocker 177 with two rollers 178 coacting, respectively, with cams 179, 180 on a handle shaft 181. This shaft, to be fully described hereafter, is rotated clockwise for addition and counter-clockwise for subtraction. The additive cam 179 is fixed to shaft 181; its hub has a recess normally engaged by a pawl 182 (see also Figure 15B) pivoted in the subtractive cam 180 and biased by a spring 183. The subtractive cam 180 is freely rotatable on shaft 181; its hub has a recess normally engaged by a pawl 184 pivoted on shaft 176 and biased by spring 185 anchored in the machine structure. Rollers 178 are held in contact with cams 179, 180 by a spring 186 anchored in the machine structure.

When the handle shaft 181 is rotated clockwise as viewed in Figure 12, the subtractive cam 180 remains stationary, being held by its pawl 184. It has a recess 187 to allow the roller 178 to co-operate with cam 179 which rotates with shaft 181 and causes rocker 177, shaft 176, and gear segments 175 to rock clockwise; thus, segments 175 rotate pinions 172 counter-clockwise, so that totalizer gears 67 move into mesh with gears 56, as shown in Figure 12. The timing of the mesh-demesh operation is shown in the chart of Figure 16.

When the handle shaft 181 is rotated counter-clockwise as viewed in Figure 13, pawl 182 remains in engagement with recess in cam 179 and drives the subtractive cam 180 counter-clockwise. This causes the roller 178 to leave the recess 187 and to follow the outer edge of cam 180, thus causing rocker 177, shaft 176 and gear segments 175 to rock counter-clockwise, so that totalizer gears 167 move into mesh with gears 155, as shown in Figure 13.

The totalizing register comprises the following numeral wheels 166: six wheels marked 0–9 associated with fractions-of-penny denominations $D10^{-1}$—$D10^{-6}$; a wheel marked 0–11 for the pence denomination D; a wheel marked 0–9 for the units-of-shillings denomination S1; a wheel marked 0101010101 for the tens-of-shillings denomination S10; and thirteen wheels marked 0–9 for the pounds denomination $L1$—$L10^{12}$, of which the $L10^{12}$ wheel is driven by the carry device only, being without an associated group of sensing pins 96. Pinions 153 and gears 155, 156, 167 associated with all but the pence denomination have ten teeth each, whilst in the case of the pence denomination D these parts have twelve teeth each; gears 155, 156, 167 associated with the pence denomination are of a finer pitch, the pitch circle diameter being the same for all gears 155, 156, 167.

An aligner bar 188 extends along the totalizer 166; it is secured at each end to a bracket 189 pivoted at 190 in plates 161, 162 respectively. Spring 191 maintains a nose 192 on each bracket 189 in contact with cam 168. Cams 168 are so shaped that in the neutral position of totalizer shaft 158 (Figures 14A, 1B), aligner 188 is in engagement with gears 167; when cam 168 rotates in either direction, aligner 188 remains in engagement with gears 167 until they come into mesh with gears 155 or 156, as the case may be, whereupon the aligner 188 is disengaged from gears 167, Figures 12 and 13. During the demeshing operation, aligner 188 re-engages gears 167 before they are demeshed from gears 155 or 156, and maintains them in proper positions until the next operation.

Fixed to each numeral wheel 166 is a one-tooth pinion 193, Figure 17, co-acting with a carry pawl 194 rockable on shaft 195 supported in the machine structure. Each carry pawl 194 has two lugs 196, 197 for cooperation with the one-tooth pinion 193 when the totalizer is in the additive or subtractive position, respectively. Each carry pawl 194 has two arms 198, 199, coacting, respectively, with escapement teeth 200, 201 on a stepped plate 146 rockable on shaft 202 supported in the machine structure. Springs 203 interconnect carry pawls 194 and stepped plates 146.

When a numeral wheel rotates from 9 to 0 or vice-versa, its one-tooth pinion 193, in co-operation with lug 196 or 197, causes the associated carry pawl 194 to rock counterclockwise, so that the upper arm 198 releases the tooth 200 with which it was previously engaged; stepped plate 146 rocks counterclockwise, until the lower arm 199 engages one of the lower teeth 201. When carry pawl 194 is restored by spring 203 after the carry movement, lower arm 199 releases the tooth 201 with which it was previously engaged, and as the stepped plate 146 rocks slightly counter-clockwise, the upper arm 198 engages the next tooth 200 on plate 146. The position of parts after the first carry is shown in Figure 17. Stepped plate 146 coacts with lug 144 on rack 123 of the next higher denomination. Normally, that is when no carry-over is required, lug 144 is located by step 204 on plate 146, so that rack 123 is stopped in the position shown in Figure 1C. Since the differential mechanism described above is capable of dealing with three digits at a time, numeral wheels 166 may make nearly three full turns in each operating cycle and consequently provision has been made for a three-step carry. After the first carry, step 205 is aligned with lug 144 to allow for one additional space movement of rack 123, as shown in Figure 17; after the second carry, step 206 is aligned with lug 144 to allow for a two-space movement; after the third carry, stepped plate 146 is altogether out of alignment with lug 144, and instead lug 145 will run up against guide bar 127, so that rack 123 of the next higher denomination will move three additional steps.

Each stepped plate 146 has a stud 207 coacting with a lug 208 in shaft 202. At the beginning of each operating cycle shaft 202 is rocked clockwise, by means to be described hereafter, so that lugs 208 pick up the associated studs 207 and restore all stepped plates 146 to the normal position in readiness for the carry-over operation.

It may be pointed out that in the case of the tens-of-shilling denomination S10 the one-tooth pinion 193 is replaced by a five-tooth pinion, the carry being effected whenever the S10 numeral wheel 166 turns from 1 to 0 or vice-versa.

The totalizing register may be cleared in any known and convenient way, for instance by means of a clearing handle 209, Figure 18, fixed to shaft 158. Each numeral wheel 166 may have a zero lug 210, Figure 7, coacting with a lug 211 on a key 212 slidable in a keyway in shaft 158. Ends of key 212 may coact, in a customary manner, with a recess in the face of bearing 160, Figure 15B, and with a corresponding elevation on the face of bearing 159, Figure 15A. When the totalizer shaft 158 is rotated by means of handle 209, key 212 is slightly shifted to the left; lugs 211 are now in line with zero lugs 210, pick them up as the shaft rotates, and restore the numeral wheels 166 to the 0 positions. Cam 213, Figures 15A, 15B, fixedly mounted on shaft 158 serves to rock the aligner 188 out of engagement with gears 167 during the clearing operation.

*Operating and driving mechanism*

The machine is operated by means of a handle 214, Figure 15B, mounted on handle shaft 181; handle 214 is located in the usual way, for instance by means of a spring-loaded plunger (not shown). Handle shaft 181 is journalled in bearings 215 in machine frames 3, 5; it has meshing cams 179, 180 already referred to. In the following, "clockwise" and "counter-clockwise" refers to the view of Figure 14A, while "left" and "right" refers to the view of Figure 15B. As already mentioned, handle shaft 181 is rotated clockwise for additive calculations and counter-clockwise for subtractive calculations. Fixedly mounted on handle shaft 181 is a toothed disc 216 co-acting, in the conventional manner, with a pawl 217 pivoted at 218 in machine frame 5 and normally held by a spring (not shown) in the position shown in Figure 14A. Pawl 217 reaches into a recess in disc 216 and is caused to rock out according to the direction of handle rotation, thus engaging the teeth on disc 216 and preventing a reversal of handle rotation before the completion of a full turn.

Fixedly mounted on handle shaft 181 are gears 219, 220, Figure 15B, meshing, respectively, with a gear 221 freely rotatable on a cam shaft 222 and with an idler gear 223 journalled at 224 in machine frame 5. Idler gear 223 meshes with a gear 225 freely rotatable on cam shaft 222. Whenever the handle shaft 181 is rotated, gears 221, 225 on cam shaft 222 rotate in opposite directions. Cam shaft 222 is journalled in bearings 226 in machine frames 4, 5.

Gears 221, 225 have cam faces 227, 228 respectively, which coact with corresponding cam faces on a clutch 229 slidably keyed to shaft 222 and normally held in neutral position shown in Figure 15B by springs 230, 231. When handle shaft 181 is rotated clockwise, gear 221 rotates counter-clockwise, and the axial portion of its cam 227 engages a corresponding portion on the left-hand cam face on clutch 229; at the same time gear 225 rotates clockwise and its cam 228, in co-operation with right-hand cam face on clutch 229, causes the clutch to slide to the left; clutch 229 rotates the cam shaft 222 counter-clockwise. When handle shaft 181 is rotated counter-clockwise, gear 225 also rotates counter-clockwise, while gear 221 rotates clockwise and its cam 227 causes the clutch 229 to slide to the right; cam shaft 222 is rotated counter-clockwise. Thus, the cam shaft 222 is rotated in the same direction irrespective of direction of rotation of handle shaft 181.

The timing chart of Figure 16 shows the sequence of operations now to be described. The previously set perforated plates 53 are shifted into the sensing position by the pusher frame assembly 97—105 by means of the pusher rod 110 which has at each end a roller 232, Figure 14B, for movement in rails 233 secured to machine frames 4, 5. Pusher rod 110 has at each end a rod 234 connecting it to a rocker 235, Figure 14A, pivoted at 236 and biased by spring 237. Roller 238 on each rocker 235 coacts with a cam 239, see also Figures 15A, 15B, rigidly mounted on cam shaft 222 and shaped so as to produce the required reciprocating movement of pusher rod 110.

Crossbars 122, Figures 1A, 1B, supporting the lift plate 113 protrude through slots in inner machine frames 2, 3 and are secured at each end to an end plate 240, Figure 14A, which has rollers 241 running in vertical rails 242 fixed to machine frames 2, 3. Each end plate 240 has a roller 243 coacting with a cam 244, see also Figures 15A, 15B, on cam shaft 222. Rollers 243 are maintained in contact with cams 244 by the weight of the lift assembly; alternatively, springs may be provided for this purpose.

Crossbars 119, Figure 14B, of drivers 118 are secured at each end to a rack 245 which has rollers 246 running in rails 247 fixed to inner machine frames 2, 3. Each rack 245 meshes with a gear 248 rotatable on a short shaft 249 which has a roller 250 running in rails 251 fixed to machine frames 2, 3. Each gear 248 is fixed to a pinion 252 meshing with a rack 253 fixed to frames 2, 3, respectively. A rod 254 connects each shaft 249 to a rocker 255, Figure 14A, pivoted at 256; each rocker 255 is biased by a spring 257 towards the cam shaft 222 and has a roller 258 coacting with a cam 259, see also Figures 15A, 15B. A crossbar 260 interconnects the rods 254 to make the driver assembly structure more rigid. As cams 259 cause rockers 255 to swing, shafts 249 move horizontally while pinions 252 run on fixed racks 253, and gears 248 force the racks 245 to reciprocate, thus reciprocating the drivers 118.

Stepped plates 146 Figure 17 are restored by their lugs 207 and studs 208 in shaft 202 to which is fixed a bracket 261, Figure 14B, linked by a connecting rod 262 to a rocker 263, Figure 14A, pivoted at 256 and having a roller 264 biased by a spring 265 on to a cam 266 (see also Figure 15B) fixedly mounted on cam shaft 222.

Gears 267, 268, Figure 15B, are fixed to gears 221, 225 and mesh, respectively, with gears 269, 270 rotatable on a shaft 271 journalled in bearings 272 in machine frames 4, 5. Shaft 271 forms a part of the revolution register to be described hereafter. Each gear 269, 270 is formed with a cam face 273, 274, respectively, each of which has a recess 275 coacting with a lug 276, 277, respectively, on a clutch 278 slidably keyed to shaft 271. It will be remembered that gears 221, 225 rotate in opposite directions. During an additive calculation gear 225 is rotated clockwise and gear 270 counter-clockwise; the longer side of recess 275 in cam 274 engages lug 277 on clutch 278 and rotates it, and also shaft 271, counter-clockwise. At the same time gear 269 rotates clockwise, and its cam 273 slidably engages lug 276 and shifts the clutch 278 to the right, so that lug 277 positively engages recess 275 in cam 274. Thus, after the first revolution the rotation of shaft 271 may be reversed, for the purpose described hereafter. Similarly, during a subtractive calculation gear 221 is rotated clockwise and gear 269 counter-clockwise; the longer side of recess 275 in cam 273 engages lug 276 on clutch 278 and rotates it, and also shaft 271, again counter-clockwise. At the same time gear 270 rotates clockwise and its cam 274 slidably engages lug 277 and shifts the clutch 278 to the left, so that lug 276 positively engages recess 275 in cam 273. Thus, it will be seen that during the first revolution in the course of any calculation the shaft 271 is rotated counter-clockwise irrespective of direction of rotation of the operating handle 214, but after the first revolution a reversal of handle 214 will reverse the shaft 271. It may be added that after the completion of each calculation the clutch 278 is restored to the neutral position shown in Figure 15B by means to be presently described.

*Revolution register*

Shaft 271 is meshed, through gears 279, 280, 281, 282, Figure 14A, to a shaft 283 journalled in bearings 284 in machine frames 4, 3. A one-tooth pinion or driver 285, Figure 1A, is slidably mounted on shaft 283 between the left-hand carriage plate 7 and a bracket 286 fixed hereto; thus, driver 285 is shifted along shaft 283 as the carriage moves across the machine. Driver 285 serves to operate the revolution register which is of a well-known type and shall be now briefly described.

A shaft 287 is journalled in the machine structure parallel to shaft 283. Numeral wheels 288 constituting the revolution register are rotatable on shaft 287; they are spaced apart according to the carriage shift, so that in any carriage position the driver 285 is aligned with a gear 289 fixed to a numeral wheel 288. Numerals 0–9 on wheels 288 are visible through apertures 290 in the machine cover 6. Each wheel 288 is located by a spring-loaded detent 291 rockable on a shaft 292. Fixed to each numeral wheel 288 is a customary one-tooth pinion (not shown) coacting with a rocker 293 mounted on shaft 292 and normally maintained in the position shown in Figure 1A by a spring-loaded ball 294. A gear 295 rotatable on shaft 296 meshes with each gear 289. When a numeral wheel 288 moves from 9 to 0 or vice-versa, its one-tooth pinion causes the associated rocker 293 to swing out towards shaft 271; a spring-loaded carry pin 297 rockably mounted on a disc 298 fixedly mounted on shaft 271 is caused by a sloped face on rocker 293 to rock into alignment with gear 295 of the next higher denomination and to drive it one step, thus effecting the carry. Rocker 293 is then restored by a cam 299 on disc 298.

As already explained, shaft 271 (and shaft 283 geared hereto) is always rotated in the same direction during the first revolution, but it may be reversed during the subsequent revolutions. Accordingly, discs 298 have two rocking pins 297 and two cams 299 each, one serving for additive carry and the other serving for subtractive carry.

The revolution register may be cleared in the customary way, for instance as described with reference to the totalizing register, by means of a clearing handle 300, Figure 18. Clutch 278 above described may coact with a clutch fork 301, Figure 14A, pivoted at 302 in a bracket 303 secured to machine frame 5, and located in positions corresponding to the three clutch positions by a spring-loaded detent (not shown). The forward end of clutch fork 301 may protrude through a slot in machine cover 6, this slot being marked as shown in Figure 18 to indicate that the machine has been conditioned for multiplication or division, respectively. Lug 304, Figure 14A, on clutch fork 301 may coact with two face cams 305 fixedly mounted on shaft 287 of the revolution register. When shaft 287 is rotated for the purpose of clearing the revolution register, cams 305 will shift lug 304, clutch fork 301, and clutch 278 into the neutral position in readiness for the next calculation.

The machine comprises various interlocking and auxiliary devices which have not been described, as they are well known in the art and are not required for a proper understanding of the invention.

*Operation*

In order to give an example of a complete calculation, assume it is desired to multiply £141,010;0;3d. by 3¼. The multiplicand is set up by adjusting tip levers 41, Figure 18, until the desired numerals appear in apertures 44. The carriage being in the initial position 0, operating handle 214 is rotated clockwise. Handle shaft 181, Figure 15B, drives the cam shaft 222 through gears 219, 221 and clutch 227. Cams 239 cause the pusher rod 110, Figure 1B, to move forward, so that the pusher frame 97—105 brings perforated plates 53 shown in the top row marked 0 of Figure 6 into the sensing position. Cams 244 now cause the end plates 240, Figure 14A, to descend, thus lowering the lift plate 113, Figure 10; those sensing pins which drop through holes in plates 53 allow their slides 112 to deposit their transmission elements 117 on the respective drivers 118. Now, cams 259 cause crossbars 119 to move forward, and drivers 118 drive the racks 123 forward differentially through the medium of transmission elements 117. Lift plate 113 is now raised by its cams 244, and rails 139 lift the elements 117 into position shown in Figure 11; at the same time, the totalizing register 166 is shifted into additive position shown in Figure 12. Driving cams 259 now restore the drivers 118, and the racks 123 drive the totalizing register 166 differentially. At the end of the operating cycle the totalizing register 166 and the pusher rod 110 are restored; the totalizing register shows the set-up amount £141,010;0;3d. During this cycle, the 0 numeral wheel 288 of the revolution register has been driven one step through driver 285, shafts 283, 271, clutch 278, gears 269, 267.

This operation is effected three times, whereupon the totalizing register 166 shows £423,030;0;9d. and the revolution register 288 shows 3 in the 0 wheel. Now, the shift lever 17 is depressed and the carriage shifted one step to the right into the —1 position; the perforated plates 53 assume the position shown at —1 in Figure 6. Operating handle 214 is now rotated twice, the amount £14,101;0;0.3d. being sensed each time, so that the totalizing register 166 shows now £451,232;0;9.6d.; the revolution register 288 shows 3.2.

Shift lever 17 is again depressed to shift the carriage another step to the right; perforated plates 53 are now in the position shown at —2 in Figure 6. Operating handle 214 is now rotated five times, adding each time the amount £1,410;2;0.03d. The totalizing register 166 will now show the result £458,282;10;9.75d., and the revolution register 288 will show the multiplier 3.25.

Division is effected in the manner customary with the repeated-addition machines, the operating handle 214 being turned counter-clockwise as in subtraction.

*Modification*

It is evident that the transmission elements 117, Figure 8, can be of any suitable shape. For instance, cylindrical plates or balls may be conveniently used; Figures 19, 20, 21 illustrate a modification of the mechanism described above, wherein the elementary plates 117 have been replaced by balls 1117 made of non-compressible materials such as steel.

Balls 1117 are made to serve as transmission medium in the following manner. Slides 1112 contain, similarly to slides 112 of the first-described embodiment, 1, 3, 1, 6 balls 1117 in each set of each denominational group; balls 1117 are normally contained within a cylindrical bore 1000 of each slide 1112, which are formed with a slot to clear the driver 1118. In the course of the sensing operation pins 96 of some slides 1112 penetrate through holes in perforated plates 53, as shown in Figure 19, which reproduces the position at the end of forward stroke, similarly to Figure 10. Thus, some slides 1112 are lowered, as shown on the right of Figure 20. In this position, the upper bores 1000 in the lowered slides 1112 become aligned with lower bores 1001 in those slides 1112 which have remained substantially stationary as their sensing pins 96 have not encountered holes in plates 53. Thus, at the end of the sensing operation the upper bores 1000 in the lowered slides 1112 and the lower bores 1001 in the stationary slides 1112 again constitute a channel or conduit for balls 1117, so that they may be driven by the driver 1118 to the left as viewed in Figure 19 on to lift rails 1139 similar to rails 139 but shaped as in Figure 21. Drivers 1118 are similar to drivers 118 but are shorter and do not possess the restoring lugs 140, Figure 10. As the transmission balls 1117 are driven on to rails 1139, they transmit their movement to slides 1003, Figures 19 and 21. Transmission balls 1117 may have a fairly tight fit in the bores 1000, 1001, in order to prevent inadvertent displacement. Slides 1003 are similar to racks 123 but do not possess teeth for driving the totalizing register as racks 123 do; instead, a rack 1123 is slidably mounted on pins 1004 on the side of each slide 1003, a spring 1005 interconnecting each slide 1003 with its rack 1123. Racks 1123 drive the totalizer wheels 166 in the same manner as racks 123 of the first- described embodiment; they have lugs 144, 145 co-operating with the carry device as described. In the present modification, slides 142, Figure 10, of the first-described embodiment are omitted; instead each driver 1118 has a fixed lug 1142, Figure 19, coacting with lug 141 on tail 130 of each slide 1003.

At the end of forward stroke of the pence driver 1118 shown in Figure 19 the slide 1003 has been shifted forward as shown due to the presence of fourteen transmission balls 1117 between the driver 1118 and the arm 1128 on slide 1003. Now, the lift plate 113 is raised as described above, thus restoring the slides 1112 to the upper portion, and also lifting the rails 1139 so that the balls 1117 contained herein are aligned with upper bores 1000 in the restored slides 1112. Now, drivers 1118 are restored, in the same manner as drivers 118 of the first-described embodiment; their lugs 1142 pick up lugs 141 on respective slides 1003 and restore them to the starting position shown in dash-dotted lines in Figure 19. At the same time the racks 1123 are restored, driving the totalizer 166 as described above with reference to racks 123; their lugs 144 or 145 are arrested as described in positions required for the carry operation. Apart from modification stated above, the whole mechanism is arranged and operates essentially like the first-described embodiment.

A very convenient shape of parts constituting the sensing and value-entering mechanism is obtained in a second modification shown in Figures 22, 23. As in the first-described modification, balls 1117 are used as transmission medium, but slides 2112 replace slides 1112 of the first modification. These slides 2112 have cylindrical bores 2000 and 2001 arranged, similarly to bores 1000, 1001 of the first modification, so that upper bore 2000 of a lowered slide is in line with lower bore 2001 of the substantially stationary slide. Drivers 2118 are cylindrical in shape. In the course of the driving operation they enter the upper bores 2000 of the descended slides 2112 and the lower bores 2001 of the substantially stationary slides 2112 which constitute a conduit for the transmission balls 1117. Thus, balls 1117 are driven into a lift 2139 which is fixed to the lift plate 113 similarly to rails 1139 or 139; lift 2139 comprises a block formed with cylindrical bores, each of which is aligned with a driver 2118 when the lift 2139 is in the descended position of Figure 22. A plunger 2006 is slidable within each bore in the lift 2139. When the transmission balls 1117 are driven by drivers 2118 into the lift 2139, they drive the plungers 2006 forward (to the left in Figure 22); the plungers engage arms 2128 on slides 2003 and drive them forward accordingly. Figure 22 shows the pence value-entering mechanism sensing the values 4, 8, and 2, similarly to Figures 19 and 10, at the end of forward stroke of driver 2118. It will be seen that the slide 2003 has been moved forward from the initial position shown in dash-and-dot lines in accordance with fourteen transmission balls 1117 interposed between driver 2118 and plunger 2006. In this second modification, the drivers 2118 must be restored before, and not after, the slides 2112 have been restored to the upper position. Drivers 2118 do not possess restoring lugs 1142 as drivers 1118 of the first modification do; they are fixed to crossbars 2119 restored on completion of the forward driving stroke and before the upward lift movement by suitably shaped cams as described above. When the drivers 2118 have been restored, lift plate 113 is raised as described, thus bringing the transmission balls 1117 inside the lift 2139 into alignment with upper bores 2000 in the restored slides 2112. Slides 2003 do not have lugs 141 but instead are formed with restoring lugs 2141; otherwise, they are essentially like the slides 1003 of the first modification, and have racks 1123 which are exactly the same as in the first modification. Restoring lugs 2141 co-operate with a restoring bar 2007 which is reciprocated by a mechanism essentially like that described above with reference to the reciprocation of crossbars 119 of the first-described embodiment. As the restoring bar 2007 is moved rearwards, it picks up lugs 2141 on slides 2003 and restores them, whilst racks 1123 drive the totalizer 166 and effect the carry whenever required as described above. While the slides 2003 are driven rearwards, their descending arms 2128 drive plungers 2006 which restore the transmission balls 1117 back into the upper bores 2000 of slides 2112, thus completing the circulating movement of balls 1117. Lift 2139 is slotted as at 2008 to clear the arms 2128 of slides 2003. Restoring bar 2007 may be restored to the position of Figure 22 during the next sensing operation.

The transmission medium used in the value-entering mechanism made according to the present invention is not limited to elements 117 or balls 1117. As made evident by the foregoing description, any suitable transmission medium that can be brought, in quantities proportionate to the values sensed in the course of the sensing operation, into operative association with the drivers 118 (or 1118 or 2118) making a predetermined stroke will drive the racks 123 (or slides 1003, 2003) differentially according to the sum of these quantities, as required. The condition is that the transmission medium is substantially non-compressible, and that it is readily divisible into elementary quantities proportionate to the values to be sensed and/or entered. Thus, upper bores 2000 of slides 2112 of the second modification may be filled with a substance such as mercury which does not wet the material of the slides, means being provided to prevent any leakage; the quantity of this substance brought into operative association with drivers 2118 by each slide 2112 will be proportionate to the width of each slide, and consequently to the values to be sensed and/or entered; thus, this substance will serve as a transmission medium to drive the denominational wheels of the totalizing register differentially according to the sum of values to be entered into respective wheels, as required.

Balls 1117 in the modifications described above may be made flat on two opposite sides to form round plates 2117, Figures 24, 25, of standard diameter and thickness. The advantage of these round plates 2117 as compared with balls 1117 is that they do not tend to climb or creep on top of each other when slightly off centre, and consequently they do not require such accurate conduits as the balls 1117.

What I claim is:

1. In a calculating, adding, and like machine, a value-entering differential mechanism for the totalizing register comprising a plurality of conduits, one conduit for each denominational registering element of the said totaliser, each conduit comprising a first section normally filled with a transmission medium readily divisible into a plurality of elementary quantities, a second section for temporarily storing quantities of said transmission medium, and a third section serving as a return passage from the second section to the first section, groups of input members operatively associated with each of said conduits, each input member being adapted to cause a predetermined quantity of said transmission medium to move from the first section to the second section of the respective conduit, driving means for driving the said transmission medium from the second sections into the third sections and thence back into the first sections of said conduits, means for reciprocating the said driving means through a predetermined stroke during each operating cycle, output members each operatively associated with one of said conduits, coupling means on said output members for engagement by the said transmission medium while the latter is being driven by the said driving means, means for restoring the said input members, means for restoring the said output members, and means for coupling the said output members to the respective denominational registering elements of the totalizer.

2. In a machine having a totalizing register, a sensing and value-entering differential mechanism comprising a plurality of conduits, one for each denominational registering element of the said totalizer, each conduit comprising a first section normally filled with a transmission medium readily divisible into a plurality of elementary quantities, a second section for temporarily storing quantities of said transmission medium, and a third section serving as a return passage from the second section to the first section, a group of sensing members operatively associated with each of said conduits, each sensing member being adapted to sense a predetermined numerical value, input members each actuated by one of said sensing members to move a quantity of said transmission medium proportionate to the sensed value from the first section to the second section of the respective conduit, driving means for driving the said transmission medium from the second sections into the third sections and thence back into the first sections of said conduits, means for reciprocating the said driving means through a predetermined stroke during each operating cycle, output members each operatively associated with one of said conduits, coupling means on said output members for engagement by the said transmission medium while the latter is being driven by the said driving means, means for restoring the said sensing members and the said input members, means for restoring the said output members, and means for coupling the said output members to the respective denominational registering elements of the totaliser.

3. In a machine having a totalising register, a differential mechanism comprising one conduit for each denominational registering element of the said totaliser, each conduit having a first section normally filled with transmission elements of standard thickness, a second section for temporarily storing some or all of said transmission elements, and a third section serving as a return passage for returning the said transmission elements from the second section to the first section of the said conduit, a group of input members operatively associated with each of said conduits, each input member being adapted when actuated to move a predetermined number of said transmission elements from the first section into the second section of the respective conduit, actuating means for said input members, driving means for driving the transmission elements from the second sections into the third sections and thence back into the first sections of the respective conduits, means for reciprocating the said driving means through a predetermined stroke during each operating cycle, output members each operatively associated with one of said conduits, coupling means on said output members for engagement by the said transmission elements while the latter are being driven by the said driving means, means for restoring the said actuating means and the said input members, means for restoring the said output members, and means for coupling the said output members to the respective denominational registering elements of the said totaliser.

4. In a machine having a totalizing register, a differential value-entering mechanism comprising groups of input members, one group for each denominational registering element of the said totaliser, each input member having a first channel normally filled with a predetermined number of transmission elements of standard thickness and a second channel normally empty of said transmission elements, the said first and second channels respectively of a group of said input members being normally in line forming the first and the second continuous section, respectively, of a conduit, a third section of which is formed by a channel aligned during the driving operation with the second section of the respective conduit, actuating means for moving each input member individually so that its first channel becomes aligned with the second section of the respective conduit, driving means for driving the said transmission elements from the second section into the third section of each conduit, means for reciprocating the said driving means through a predetermined stroke during each operating cycle, an output member operatively associated with each of said groups of input members, means for coupling each output member to the said transmission elements while the latter are being driven by the said driving means, means for moving the third sections of said conduits into alignment with the first sections on completion of the driving operation, means for restoring the said actuating means and the said input members, means for restoring the said output members and the said transmission elements, and means for coupling the said output members to the respective denominational registering elements of the said totalizer.

5. A differential mechanism according to claim 4, wherein the said actuating means are constituted by sensing elements for sensing, respectively, predetermined numerical values, each sensing element being operatively associated with, or forming a part of, one of said input members, the numerical value associated with each sensing element being identical with the number of the said transmission elements contained within the associated input member.

6. A differential mechanism according to claim 4, wherein the said actuating means comprise sensing elements each operatively associated with, or forming a part of, one of said input members, each sensing element being adapted to sense the representations of that numerical value which corresponds to the number of transmission elements within the associated input member, the said sensing elements being spring-loaded on to a common support, and operating means for moving the said support during the sensing operation towards the representations to be sensed and for restoring it on completion of the driving operation.

7. A differential mechanism according to claim 4, wherein the said actuating means comprise sensing elements each operatively associated with, or forming a part of, one of said input members, each sensing element being adapted to sense the representations of that numerical value which corresponds to the number of transmission elements contained within the associated input member, the said sensing elements being spring-loaded on to a common support on which is fixedly mounted a member formed with channels constituting the said third sections of the said conduits, the said means for moving the third sections comprising means for moving the said support during the sensing operation towards the representations to be sensed, whereby the channels in the said member are aligned with the said second sections of said conduits, and for restoring the said support on completion of the driving operation, whereby the channels in the said member become aligned with the said first sections of said conduits.

8. A differential mechanism according to claim 4, wherein the said transmission elements are of standard thickness and of a shape suitable for movement within the respective conduit and for engagement both by the said driving means and by the said output members.

9. A differential mechanism according to claim 4, wherein the said transmission elements are of standard thickness and of a shape suitable for movement within the respective conduit, each of said output members being formed as a rack meshing with a pinion adapted to be geared by the said second named coupling means to the respective denominational registering element of the totalizer, comprising means for locating the said output members in accordance with the required carry movement, and means on said driving means for yieldingly restoring the said output members on to the said locating means during the return stroke of said driving means, the said driving means comprising fixed lugs for driving the said transmission elements during the forward stroke and for restoring the said transmission elements during the return stroke, and the said first named coupling means comprising a fixed lug on each output member for engagement with the said transmission elements.

10. A differential mechanism according to claim 4, wherein the said transmission elements are of standard size and of substantially cylindrical shape.

11. A differential mechanism according to claim 4, wherein each of said output members is operatively associated with a rack, the said second named coupling means comprising means for meshing the said racks to the respective denominational registering elements of the totalizer, means for locating the said racks according to the required carry movement, fixed abutments on said output members for driving the respective racks positively during the forward stroke of said driving means, and means on said output members for yieldingly restoring the respective racks on to the said locating means during the return stroke, the said first named coupling means comprising fixed abutments on said output members for engagement with said transmission elements, the said driving means comprising fixed abutments for engagement with said transmission elements and for positively restoring the said output members in the course of the return stroke of the driving means.

12. A differential mechanism according to claim 4, wherein the said first and second channels within said input members are each formed as a cylindrical hole.

13. A differential mechanism according to claim 4, wherein the said third sections of the said conduits are each formed as a cylindrical hole in a common member, a sliding plunger being provided within each hole for operatively associating the said transmission elements with the respective output members when the said holes in the said common member are aligned either with the second sections or with the first sections of the respective conduits.

14. A differential mechanism according to claim 4, comprising overthrow-preventing means for locating each of said output members positively in whatever position it may reach at the end of the forward stroke of said driving means, comprising ratchet teeth on each output member and locating means operable at the end of forward stroke of said driving means to engage the said ratchet teeth on said output members.

15. A differential mechanism according to claim 4, wherein the said transmission elements are of standard size and of substantially spherical shape.

DANIEL BROIDO.

REFERENCES CITED

The following references are of record in the file of this patent:

UNITED STATES PATENTS

| Number | Name | Date |
| --- | --- | --- |
| 1,289,610 | Beard | Dec. 31, 1918 |
| 1,838,647 | Watters et al. | Dec. 29, 1931 |
| 2,431,906 | Arnason | Dec. 2, 1947 |

FOREIGN PATENTS

| Number | Country | Date |
| --- | --- | --- |
| 589,389 | France | Feb. 20, 1925 |
| 719,544 | France | Nov. 23, 1931 |